United States Patent [19]

Person et al.

[11] Patent Number: 5,081,886

[45] Date of Patent: Jan. 21, 1992

[54] AUTOMATIC TRANSAXLE CONTROL SYSTEM FOR AN AUTOMOTIVE VEHICLE

[75] Inventors: Dennis W. Person; Frank W. Timte; John A. Daubenmier, all of Canton; John I. Zielke, Highland; Rodney B. Smith, South Lyon; Roy S. Williams, Plymouth, all of Mich.

[73] Assignee: Ford Motor Company, Dearborn, Mich.

[21] Appl. No.: 582,470

[22] Filed: Sep. 14, 1990

[51] Int. Cl.$^5$ ............................................. B60K 41/06
[52] U.S. Cl. ............................................. 74/866
[58] Field of Search ................ 74/866, 867; 364/424.1

[56] References Cited

U.S. PATENT DOCUMENTS

| | | | |
|---|---|---|---|
| 4,856,383 | 8/1989 | Rosen | 74/866 X |
| 4,887,491 | 12/1989 | Holbrook et al. | 74/867 X |
| 4,901,603 | 2/1990 | Ishikawa | 74/866 |
| 4,903,550 | 2/1990 | Kuwayama et al. | 74/867 X |
| 4,919,012 | 4/1990 | Bolz | 74/866 |
| 4,932,282 | 6/1990 | Arisumi | 74/867 |

*Primary Examiner*—Dwight Diehl
*Attorney, Agent, or Firm*—Frank G. McKenzie; Roger L. May

[57] ABSTRACT

A control system for an automatic transmission including pressure actuated clutches and brakes adapted to control ratio changes in a planetary gear system comprising multiple function shift control valves disposed between a pressure source and pressure actuated servos for the clutches and brakes and solenoid valves under the control of a microprocessor for developing solenoid valve signals that control actuation of the shift control valves, the shift control valves being interactive, one with respect to the other, to effect multiple shift functions in response to selective actuation of the solenoid valves whereby the number of solenoid valves required is reduced and the hydraulic circuitry for the valve elements is simplified.

9 Claims, 13 Drawing Sheets

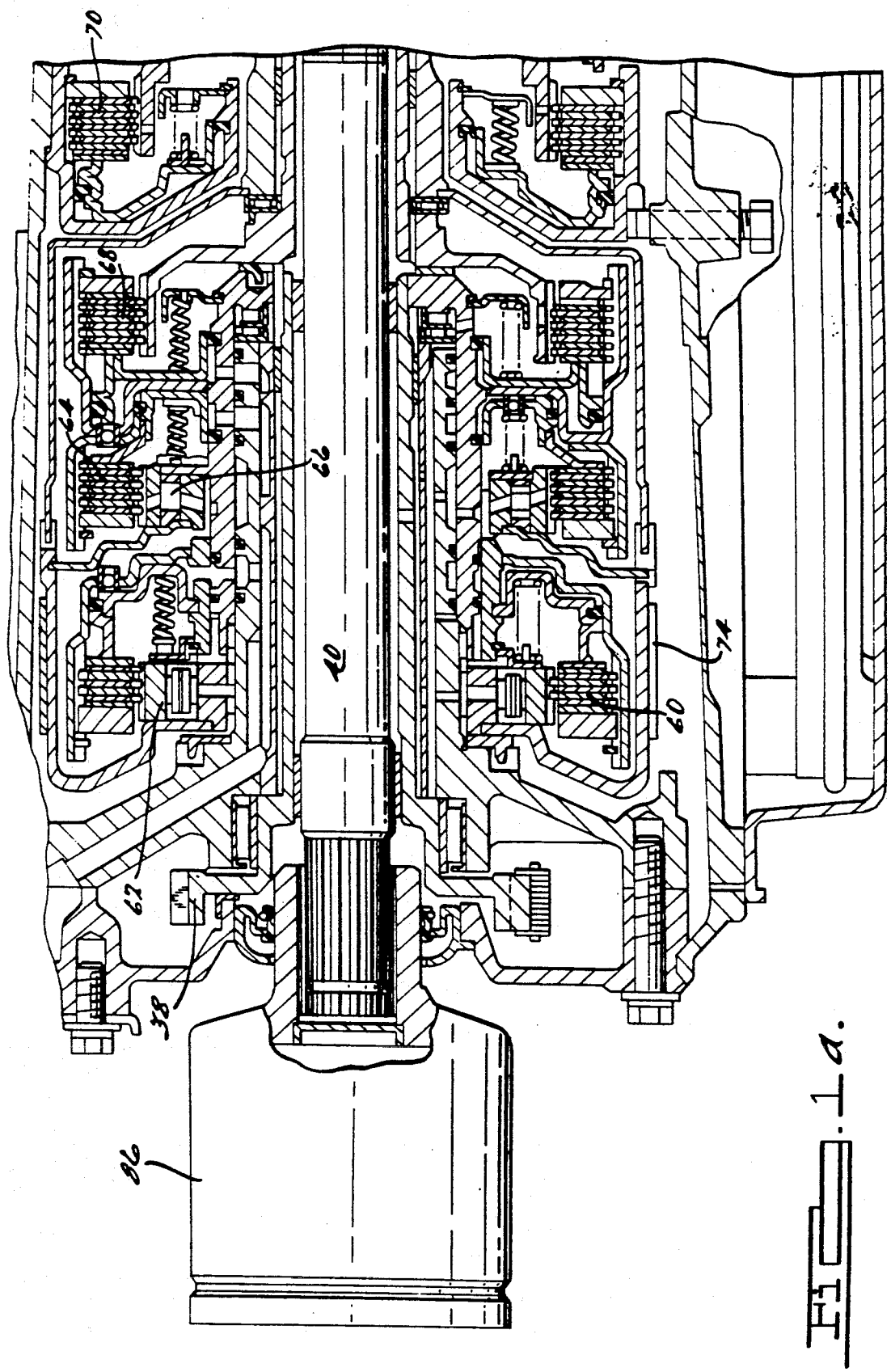

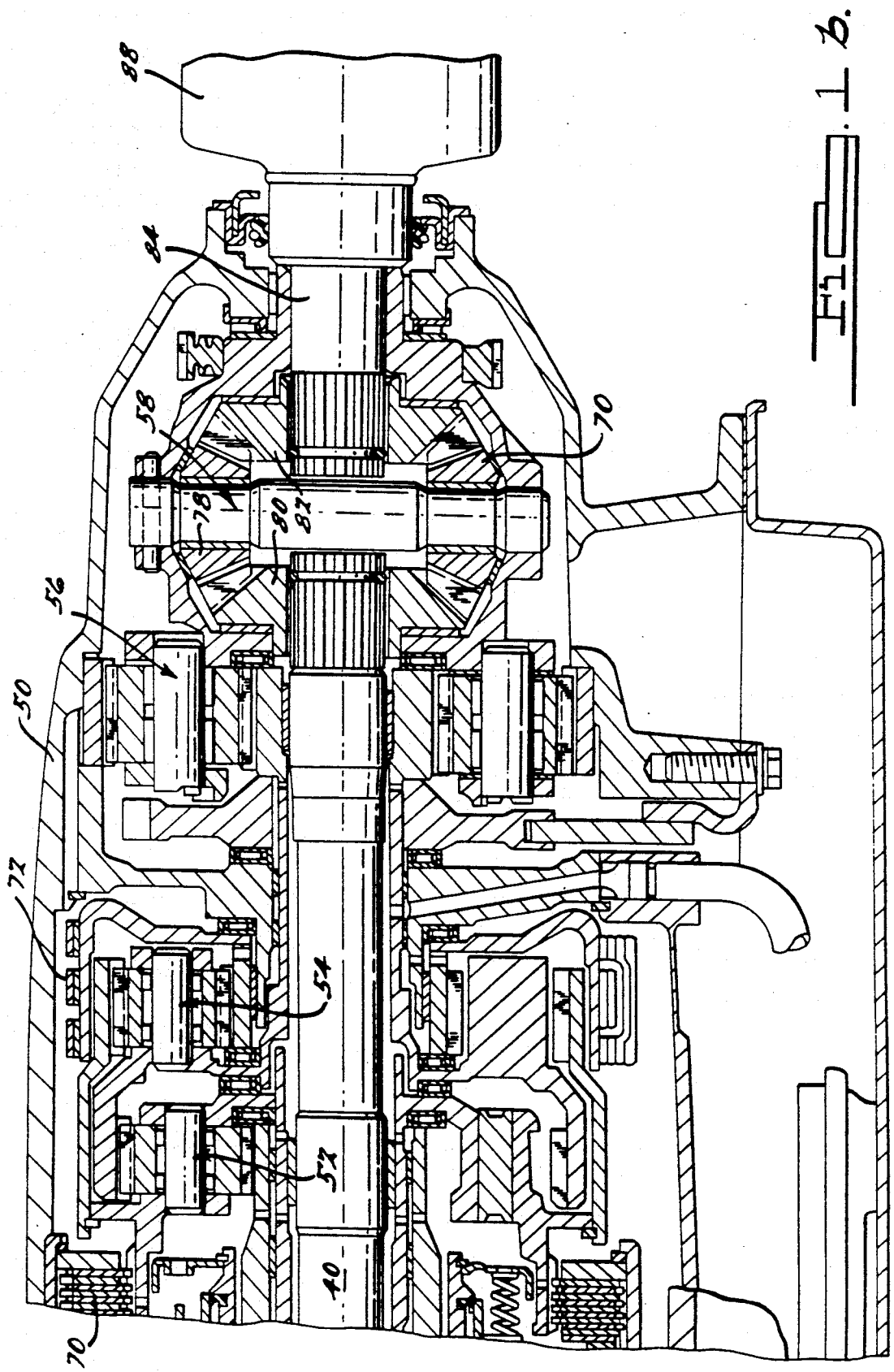

| Gear | Cl1 | Cl2 | Cl3 | Cl4 | B1 | B2 | Drive | | Coast | |
|---|---|---|---|---|---|---|---|---|---|---|
| | | | | | | | OWC 1 | OWC 2 | OWC 1 | OWC 2 |
| 1M | X | | X | | | X | X | | | X |
| 1D | X | | | | | X | X | | O/R | |
| 2 | X | X | | | | X | O/R | | O/R | |
| 3 | | X | X | | | | | X | X | |
| 4 | | X | X | X | | | | O/R | | O/R |
| R | X | | | X | | | X | | | X |

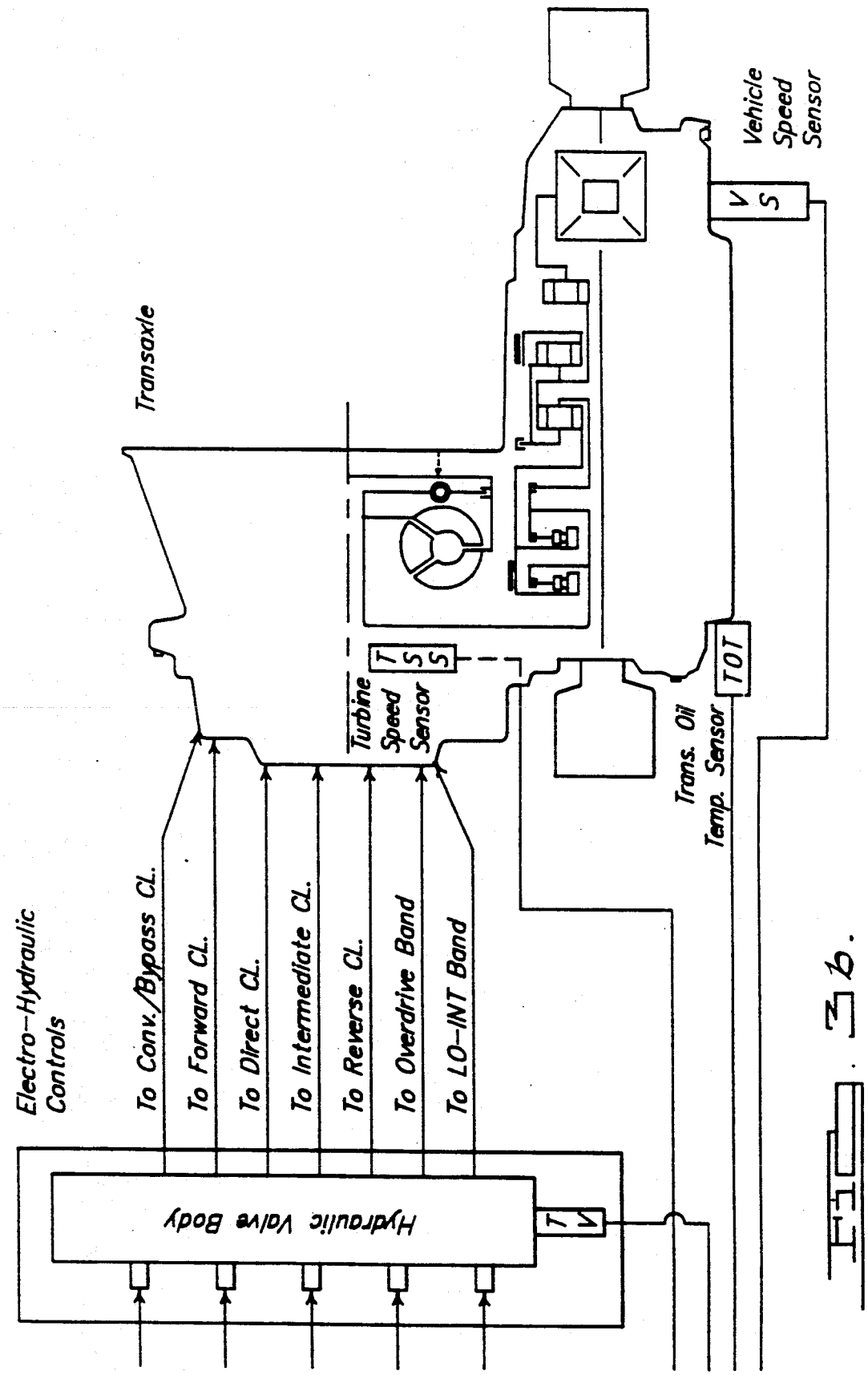

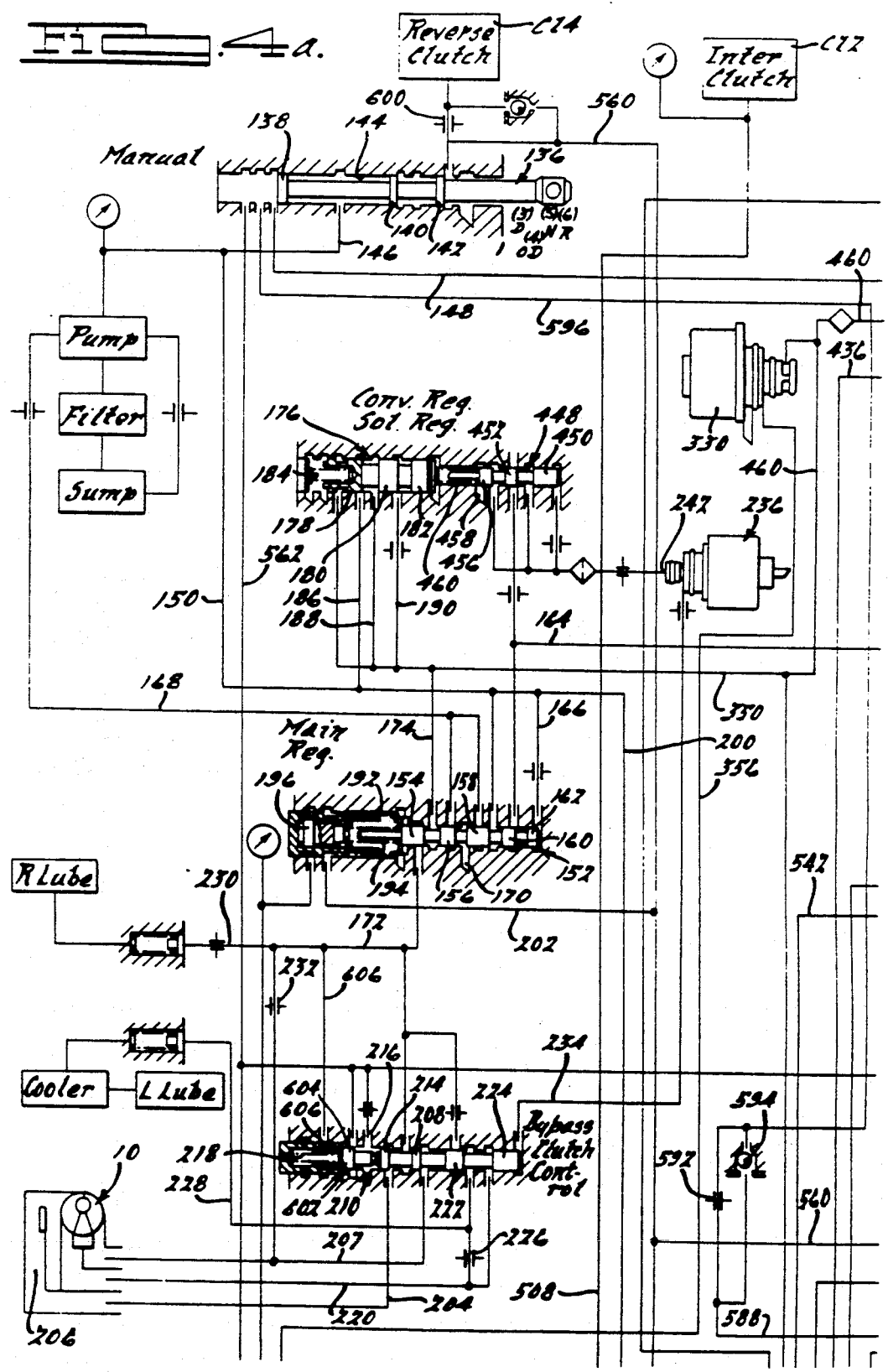

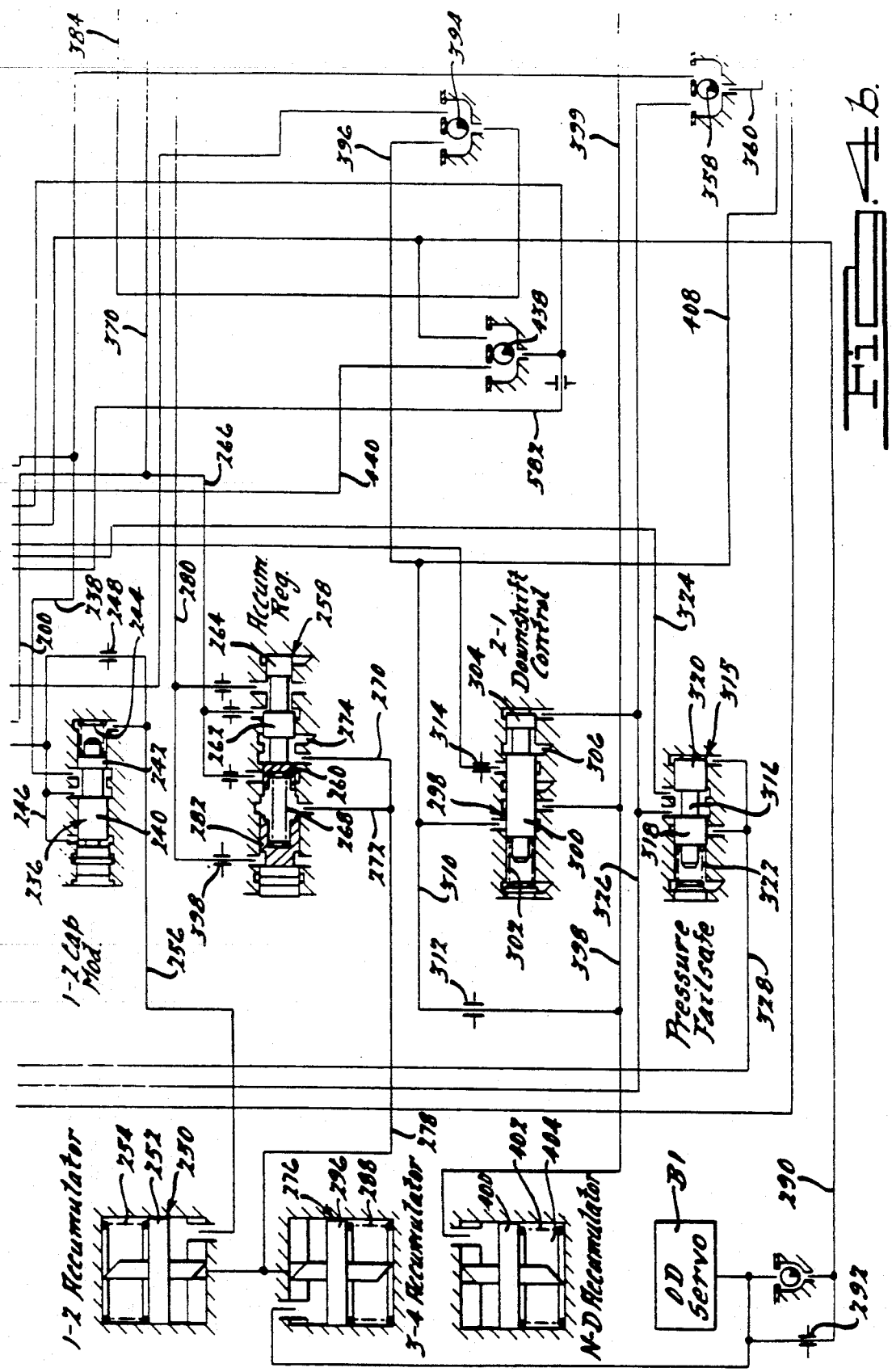

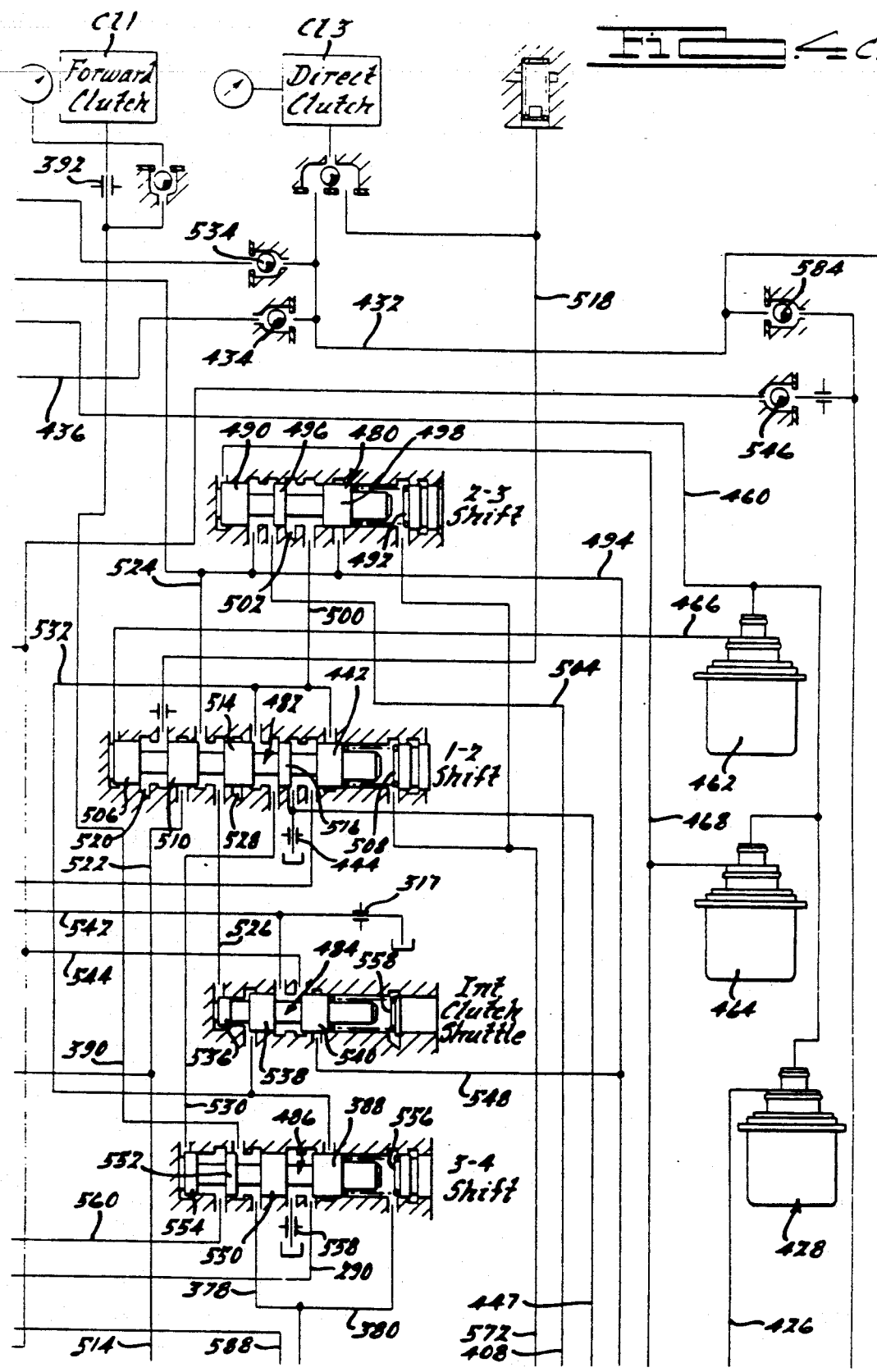

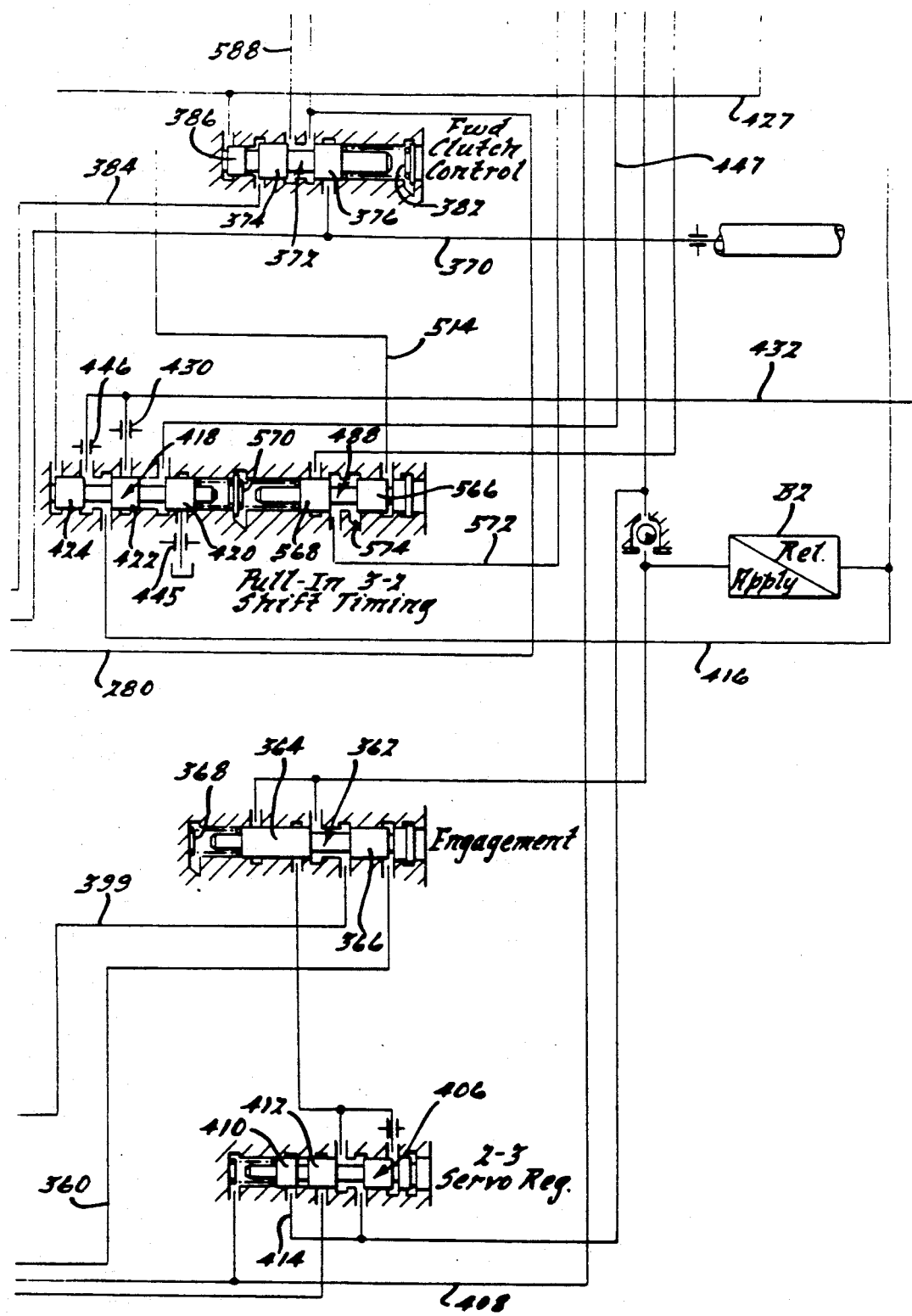

| PRNDL | OD CANCEL | GEAR | ENGINE BRAKING | SS1 | SS2 | SS3 |
|---|---|---|---|---|---|---|
| OD | OFF | 1 | NO | OFF | ON | OFF |
|  | OFF | 2 | YES | ON | ON | OFF |
|  | OFF | 3 | NO | OFF | OFF | ON |
|  | OFF | 4 | YES | ON | OFF | ON |
| 'D' | ON | 1 | NO | OFF | ON | OFF |
|  | ON | 2 | YES | ON | ON | OFF |
|  | ON | 3 | YES | OFF | OFF | OFF |
|  |  | 4 | NOT ALLOWED BY STRATEGY | | | |
| 1 |  | 1 | YES | OFF | ON | — |
|  |  | 2 | YES | OFF | OFF | — |
|  |  | 3 | NOT ALLOWED BY HYDRAULICS | | | |
|  |  | 4 | NOT ALLOWED BY HYDRAULICS | | | |
| R | R |  | NO | — | — | OFF |

AUTOMATIC TRANSAXLE CONTROL SYSTEM FOR AN AUTOMOTIVE VEHICLE

BACKGROUND OF THE INVENTION

The invention comprises improvements in a transaxle assembly of the kind disclosed in U.S. Pat. No. 4,509,389. That patent, which is assigned to the assignee of this invention, discloses a hydrokinetic transaxle for use in a front-wheel drive vehicle with the axis of the engine mounted transversely with respect to the center plane of the vehicle. The transmission comprises a three-element hydrokinetic torque converter on the engine axis and two simple planetary gear units mounted on the axis of the side gears of differential gearing on the torque output side of the transaxle.

The turbine of the torque converter of the '389 patent is connected by a torque transfer chain drive to torque input elements of the planetary gear units. The output element of the planetary gear units is connected to the torque input side of a final drive gear which transfers torque to the differential carrier of the differential gearing.

A lock-up clutch assembly in the hydrokinetic torque converter of the '389 patent establishes a fully mechanical torque transfer, when the clutch is engaged, between the engine and the turbine.

U.S. Pat. Nos. 4,633,738 and 4,665,770 disclose control systems capable of being used in a transaxle assembly of the kind disclosed in U.S. Pat. No. 4,509,389. The '738 patent and the '770 patent are also assigned to the assignee of this invention.

Each of the control systems disclosed in the '770 and '738 patents includes a fluid pressure governor valve assembly for establishing a fluid pressure signal representative of vehicle speed. They include also throttle valves of conventional kind which establish a control pressure that is a measure of engine throttle position or engine torque. Multiple shift valve assemblies respond to the signals to establish ratio changes as the clutches and brakes, which form a part of the planetary gear system, are engaged and released to satisfy driver demands and driving conditions.

GENERAL DESCRIPTION OF THE INVENTION

This invention comprises improvements in control systems of the kind disclosed in the '770 and '738 patents by substantially simplifying the control scheme and eliminating the necessity for a fluid pressure governor and conventional throttle valve assembly. The control scheme is simplified greatly by assigning multiple functions to the shift valves and by using two simple solenoid valves that respond to an electronic powertrain microprocessor to effect ratio changes. Shift timing and shift quality control elements are under the control of a third simple solenoid valve which also responds to a control signal from the microprocessor. Each of the solenoids is supplied with a common regulated solenoid valve supply pressure.

The control system includes an integrated central processor which converts signals from a vehicle speed sensor and an engine throttle position sensor as well as other sensors, such as sensors for manual selector lever position and engine speed. The processor converts the vehicle speed and throttle position signals into electrical signals for shift solenoid valves as well as a solenoid valve that controls the converter bypass clutch and a variable force solenoid that develops a so-called throttle pressure that is an indicator of engine torque. The processor receives the sensor signals and operates on them in accordance with a programmed control strategy. The processor includes appropriate gates and driver circuits for delivering the output of the operation of the strategy to the hydraulic control valve body for the transaxle.

The 1-2 shift valve that controls ratio changes between the first ratio and the second ratio is used as well in the control scheme during ratio changes between the third ratio and the fourth ratio. Similarly, the 2-3 shift valve normally used for controlling ratio changes between the second ratio and the third ratio is used as well in the control scheme during ratio changes from the intermediate ratio to each of the two higher speed ratios.

Similarly, the 3-4 shift valve has multiple functions. That shift valve acts in cooperation with an intermediate clutch shuttle valve to establish appropriate clutch distribution passages between the pressure source and each of the clutch and brake servos that control ratio changes.

BRIEF DESCRIPTION OF THE DRAWINGS

FIGS. 1, 1a and 1b show a cross-sectional view of the torque and planetary gearing of a transaxle capable of embodying the control system including the improvements of our invention.

FIGS. 3a and 3b show a schematic representation of a microprocessor that is used for controlling the solenoid valves for the hydraulic valve circuit.

FIGS. 4a, 4b, 4c and 4d show schematically the hydraulic control valve circuit for controlling clutch and brake servo pressures for the transmission of FIG. 1.

PARTICULAR DESCRIPTION OF THE INVENTION

Transaxle

Figure 1:
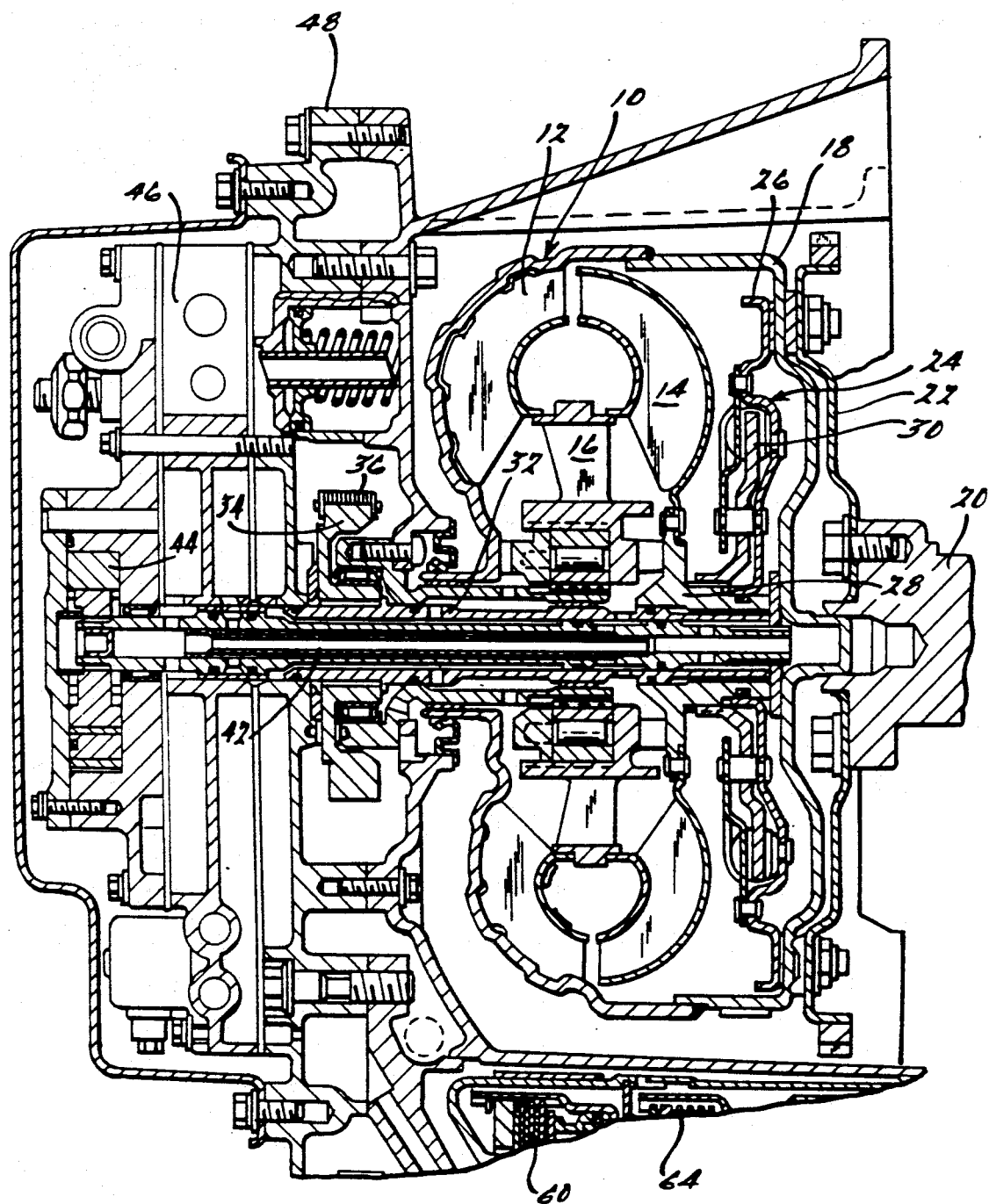

Shown in FIGS. 1, 1a and 1b is a cross-sectional view of the torque converter and planetary gearing of a transaxle capable of being controlled by the control system of this invention. The transaxle includes a torque converter 10 having a bladed impeller 12, a bladed turbine 14 and a bladed stator 16 arranged in a toroidal fluid flow circuit. The impeller 14 includes an impeller housing 18 which is connected drivably to an engine crankshaft 20 by means of a drive plate 22.

A bypass clutch assembly 24 is situated in the impeller housing 18 and is adapted to establish a mechanical torque flow path between the impeller and the turbine. The bypass clutch 24 includes a clutch plate 26 having an annular friction surface at a radially outward location which engages a friction surface formed on a radially outward portion of the impeller housing 18. Clutch plate 26 is connected to the hub 28 of the turbine 14 by means of a torsional damper assembly 30. A turbine sleeve shaft 32 is connected drivably to a driving sprocket 34 of a torque transfer chain drive, which includes a drive chain 36 and a driven sprocket 38 located on the axis of a torque output shaft 40.

The impeller housing 18 is connected drivably by means of central shaft 42 to a positive displacement gear pump 44 which serves as a fluid pressure source for the control system. Pump 44 is a positive displacement vane pump with a variable displacement feature. The control valve system is located in a valve body 46 secured to the housing portion 48 enclosing the chain transfer drive.

The planetary gear units for the transaxle are located in housing portion 50. The gear units comprise a first simple planetary gear unit 52 and a second simple planetary gear unit 54. A final drive gear unit 56 is located on the torque output side of the planetary gear units between the gear units and a differential gear assembly 58.

The speed ratios achieved by two simple planetary gear units are controlled by a forward clutch 60 and a low ratio overrunning coupling 62, a direct clutch 64, a direct overrunning coupling 66, an intermediate clutch 68, and a reverse clutch 70. In addition to the clutches and the overrunning couplings, there are two friction brakes comprising low-and-intermediate brake bands 72 and overdrive brake band 74.

The differential gear assembly 58 includes differential pinions 76 and 78, which mesh with differential side gears 80 and 82. Side gear 80 is splined to one end of output shaft 40, and side gear 82 is splined to a companion output shaft 84. Universal joint assemblies 86 and 88 connect the shafts 40 and 84, respectively, to axle half shafts for each of the vehicle traction wheels.

Figures 1C, 2:
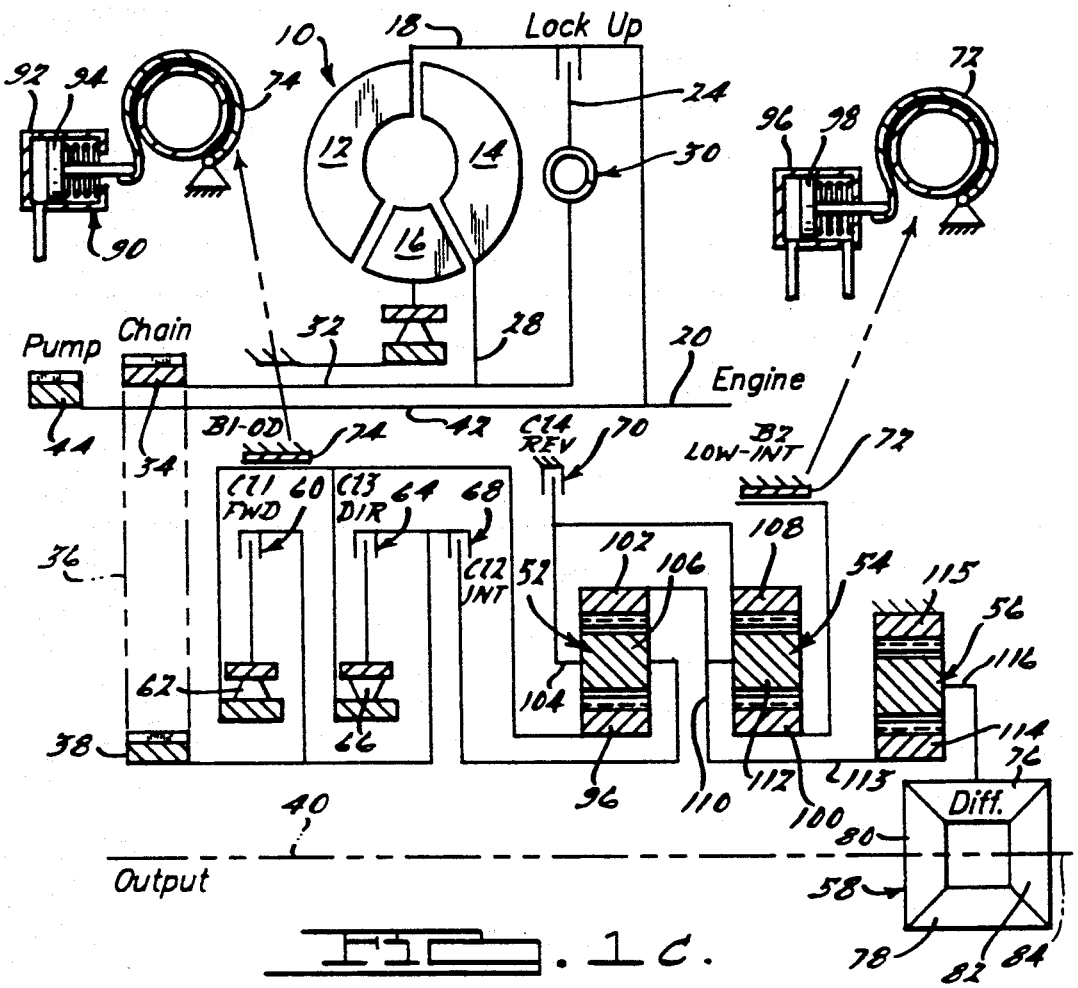
FIG. 1c is a schematic representation of the converter and planetary gear units of FIGS. 1, 1a and 1b.
FIG. 2 is a chart that shows the clutch and brake engagement and release pattern for each of the gear ratios that may be achieved with the transmission structure of FIG. 1.

The transaxle structure of FIGS. 1 through 1b is illustrated schematically in FIG. 1c. The fluid pressure operated brake servo 90 applies and releases overdrive brake band 74. The servo comprises a cylinder 92 which receives servo piston 94. Cylinder 92 and piston 94 define a pressure chamber which, when pressurized, applies brake band 74, thereby anchoring sun gear 96 for the planetary gear unit 52.

Low-and-intermediate brake band 72 is applied and released by a brake servo comprising cylinder 96 and a double-acting piston 98 located within the cylinder 96. Piston 98 and cylinder 96 define a pair of opposed pressure chambers When both chambers are pressurized, brake band 72 is released When the pressure chamber on the left side of the piston 98 is pressurized, the pressure chamber on the right side of the piston is exhausted and the piston is stroked, thereby engaging the brake band 72, thus anchoring sun gear 100 for gear unit 54.

Gear unit 52 comprises, in addition to the sun gear 96, a ring gear 102, a carrier 104, and planet pinions 106 journalled on the carrier 104. Pinions 106 mesh with ring gear 102 and sun gear 96.

Gear unit 54 comprises, in addition to sun gear 100, ring gear 108, carrier 110 and planet pinions 112 journalled on the carrier 110.

Ring gear 102 of the gear unit 52 is connected drivably to carrier 110 which, in turn, is connected to output shaft 113 which delivers torque directly to sun gear 115 of the final drive gear unit 56. Ring gear 114 of the gear unit 56 is connected to and anchored by the transmission housing. Carrier 116 of the gear unit 56 is connected directly to the differential housing which supports the pinion shaft on which the pinions 76, 78 are journalled.

The forward clutch 60, the direct clutch 64, the intermediate clutch 68 and the reverse brake 70 are actuated by their respective servo pistons which are received in servo cylinders and which define with the cylinders pressure working chambers that energize multiple friction discs. In each instance, a piston return spring acts on the piston to oppose the fluid pressure force of the working pressure.

The chart of FIG. 2 shows the clutch and brake engagement and release pattern for the clutches and brakes illustrated schematically in FIG. 1c. For purposes of correlating the schematic representation of FIG. 1c with the chart of FIG. 2, the forward clutch is identified in FIG. 2 by the symbol CL1, the direct clutch 64 is identified in FIG. 2 by the symbol CL3, the intermediate clutch 68 is identified in FIG. 2 by the symbol CL2, the reverse brake 70 is identified in FIG. 2 by the symbol CL4, the low-and-intermediate brake band 72 is identified in FIG. 2 by the symbol B2, and the overdrive brake band 74 is identified in FIG. 2 by the symbol B1. Further, the forward overrunning coupling 62 is identified in FIG. 2 by the symbol OWC1, and the direct overrunning coupling 66 is identified in FIG. 2 by the symbol OWC2.

The gear ratios that may be obtained with the gearing of FIG. 1c are listed in the left-hand vertical column of FIG. 2. The corresponding clutch or brake that is applied to achieve any given gear ratio is identified in FIG. 2 by the symbol X. In the case of the overrunning couplings, the engaged state of the overrunning coupling is identified in FIG. 2 by the symbol X; and the overrunning state is identified by the symbol OR, which is an overrunning condition.

The various drive ranges that may be obtained for the transmission structure of FIGS. 1, 1a and 1b are determined by the position of a manual valve, which will be described with reference to FIG. 4a.

To obtain the low-speed driving ratio, clutch CL1 is applied, as indicated in FIG. 2. If coast braking is desired in low ratio, direct clutch Cl3 is applied. On the other hand, if the transmission is conditioned for the normal drive mode, with a full range of ratios, clutch CL3 is not applied and no braking torque is available since overrunning coupling OWC2 transmits torque reaction in only one direction.

Low-and-intermediate brake band B2 is applied in low ratio, thereby anchoring sun gear 100 which serves as a reaction point The torque on the driven sprocket 38 thus is transferred through the forward clutch CL1 to the sun gear 96. A split torque delivery path, therefore, occurs through gear unit 52 as the carrier 104 drives a ring gear 108 which, in turn, delivers torque to the carrier 110 and the output shaft 112.

The ratio change from the low speed ratio to the intermediate speed ratio is achieved by engaging clutch CL2. This causes overrunning coupling OWC1 to freewheel as torque is transferred through the engaged clutch 68 to the carrier 104. A ratio change from the intermediate ratio to the direct drive ratio is achieved by engaging clutch CL2 as clutch CL1 is released. Clutch CL3 remains applied so all of the elements of the gear units rotate together in unison with a one-to-one ratio.

Overdrive ratio is achieved by continuing to release clutch CL3, by continuing to apply clutch CL2, and by continuing to apply clutch CL3 as the overdrive brake band B1 is applied. Since the sun gear 96 is anchored by the overdrive brake band, the ring gear 102 and the output shaft 112 are overdriven. Overrunning coupling OWC2 freewheels during overdrive.

Reverse drive is achieved by engaging simultaneously clutch CL1 and reverse brake CL4. Clutches CL2, CL3, and brake B1 are released Torque of the driven sprocket 38 then is transferred through clutch CL1 and the overrunning coupling OWC1 to the sun gear 96. Since carrier 104 is anchored by the reverse brake CL4, ring gear 102 is driven in a reverse direction together with output shaft 112.

The Control Valve Circuit Of FIGS. 4a and 4b

The driveshaft 42, which extends through the torque converter 10 drives the pump rotor 118.

As the rotor is driven, pump vanes rotate within the pump cavity, thereby developing a fluid pressure in known fashion. Fluid is supplied to the intake ports for the pump 44 from sump 132 through filter 134.

Fluid is supplied from the pump to manual valve 136 shown in FIG. 4a. This valve comprises a valve spool with spaced lands 138, 140 and 142 which register with internal valve lands in manual valve bore 144. The manual valve, in known fashion, may be adjusted by the vehicle operator to any drive range position. In the embodiment disclosed in this specification, the positions are drive range D, which provides for three forward driving ratios; an overdrive position OD, which conditions the transmission for operation in each of four forward driving ratios including an overdrive; a manual low position; a neutral position N and a reverse drive position R. In the position shown in FIG. 4a, manual valve 136 distributes pressure from pump supply passage 146 to passage 148 which is pressurized during operation of overdrive OD and drive range D.

The pump supplies passage 150, which leads to main regulator valve spool 152. Regulator valve spool 152 comprises lands 154, 156, 158, 160 and 162. The first three lands are of equal diameter, but land 162 has a smaller diameter. This permits line pressure from passage 164 to be distributed to the differential area of lands 160, 162 during operation in the second, third and fourth ratios following an upshift from the first ratio. Pump pressure passage 150 supplies the valve chamber for the valve spool 152 at a location intermediate lands 158, 160. The feedback passage 164, including a control orifice, provides for a pressure regulating feedback pressure.

An output pressure passage 168 communicates with ports that register with lands 156 and 158, and exhaust port 170 is located between the lands 156 and 158. A regulated converter pressure in passage 174 Communicates with passage 172 when land 154 uncovers passage 172.

Passage 174 is supplied with pressure from converter regulator valve assembly 176. This valve assembly comprises pressure regulating valve lands 178, 180, and 182 which are spring loaded in a right-hand direction by valve spring 184. Pump pressure is supplied to the converter regulator valve through passage 186. Passage 188 feeds passage 174 described previously as converter regulator valve assembly 176 modulates the pressure in passage 186, with passage 190 being a feedback passage.

The main regulator valve assembly includes valve springs 192 and 194. A TV booster valve element 196 provides an anchor for the spring 194. When throttle valve pressure is admitted to the left side of the valve element 196, the fluid pressure force is transmitted to the valve 152 through the spring.

The presence of a throttle valve pressure on the valve element 196 will cause an increase in the spring force of spring 194, thereby increasing the regulated line pressure made available to line pressure passage 200. During operation in reverse drive, reverse line pressure from passage 202 is distributed to the differential area of spaced lands on the valve element 196, thereby creating an additional force on the spring 194 which augments the line pressure in passage 200.

Passage 172 which receives regulated converter pressure from passage 174 through the space between lands 154, 156 communicates with bypass clutch passage 204. This pressure regulates the pressure made available to the control space 206 of the torque converter 10. Passage 172 communicates with lube pressure passage 207 when land 208 of the bypass clutch control valve 210 uncovers passage 172 leading to passage 207. Regulated converter pressure in passage 172 acts on the differential area of lands 208 and 214. Land 208 registers with the port communicating with passage 172, and land 214 registers with the land adjacent port 216 which is exhausted through the manual valve. Thus, the bypass clutch pressure in passage 204 is a regulated pressure.

Valve 210 is urged in a right-hand direction by valve spring 218.

Converter fluid is returned from the converter through passage 220 which passes through the space in the bypass clutch control intermediate valve lands 222, 224. This flow complements the flow of converter return fluid through orifice 226. The fluid in passage 220 ultimately is distributed to lubrication passage 228 and the front lubrication circuit, the rear lubrication circuit including passage 230 communicates with passage 172 and with passage 206 through orifice 232.

The bypass clutch control valve 210 is a regulating valve, as explained previously. The regulating valve lands are the differential diameter lands 214 and 208. It regulates converter pressure and produces a bypass pressure in passage 204.

Converter pressure is subject to variables such as changes in throttle opening, road conditions, etc. In order to make the bypass clutch pressure insensitive to such variables in converter pressure, the bypass clutch control valve 210 is provided with a valve element 602 that engages the main valve spool. The spring 218 acts directly on the element 602. Element 602 comprises a valve land 604 and a valve extension 606, the diameter of the land 604 being greater than the diameter of extension 606. This creates a differential area which communicates with converter pressure passage 172 through passage 606. The effective area on the valve element 604 is the same as the differential area of valve lands 208 and 210. Thus, a change in converter pressure due to a variation in operating variables will produce a force on the main valve spool that is directly cancelled by the corresponding force on the valve element 604.

Thus, when the bypass clutch is calibrated to produce a desired slip for any given operating condition, the magnitude of that desired slip may be changed only by changing the duty cycle of the bypass clutch solenoid. A change in converter pressure will not require a compensating change in the duty cycle, and the control of the clutch thus is improved with respect to reliability. Torque fluctuations due to changing clutch capacity are avoided.

The regulated pressure level maintained by the bypass clutch control is changed by introducing a bypass clutch solenoid pressure to the right end of land 224 through passage 234.

Figure 9:
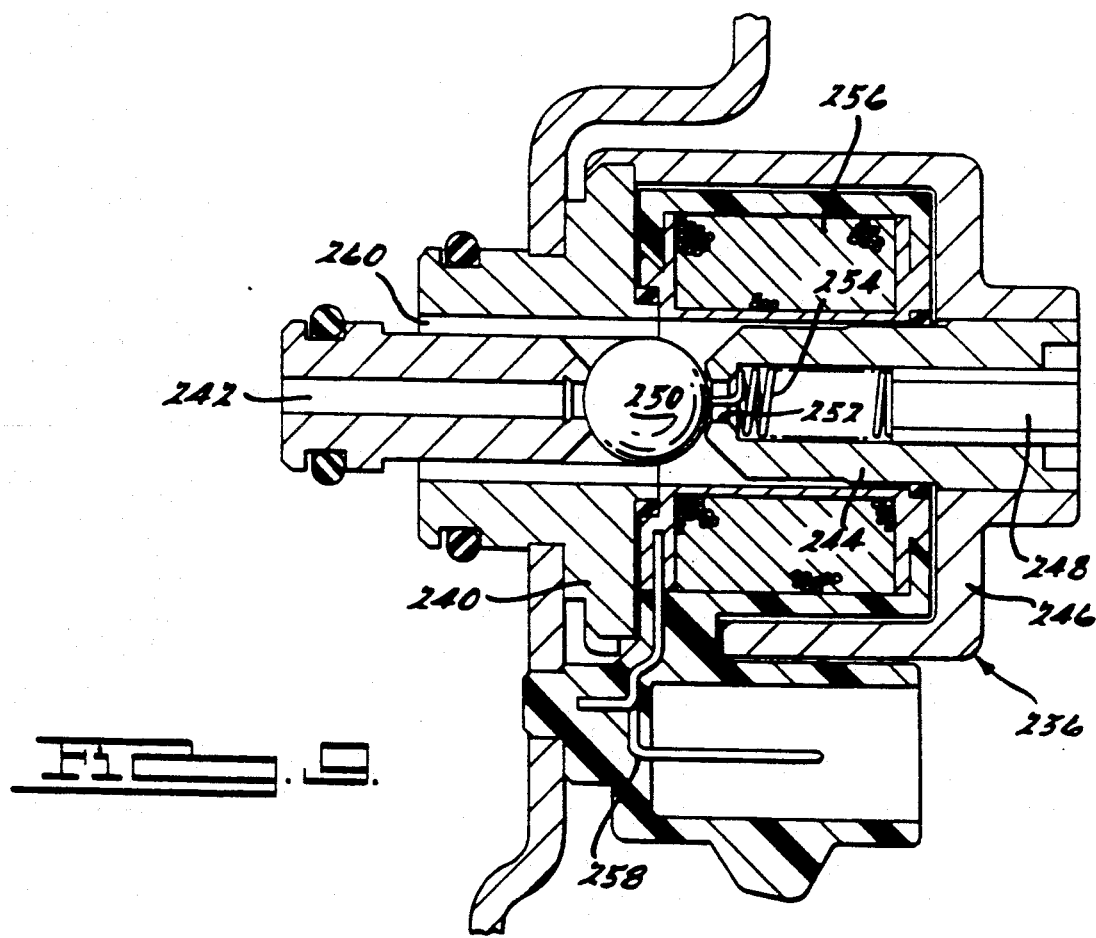
FIG. 9 is a cross-sectional view of a bypass clutch control solenoid valve assembly.

The bypass clutch solenoid shown in FIG. 4a at 236 is shown in an enlarged form in FIG. 9. It comprises a housing 240 which receives regulated solenoid pressure through an opening 242. An orifice element 244 is secured to housing portion 246 with an exhaust passage 248 aligned with opening 242. Ball valve element 250 registers with orifice 252 of the orifice element 244. A compression spring 254 is located within the orifice element 244 and has a stem at its end that normally engages the ball 250, holding it out of contact with the valve seat surrounding the opening 252.

An electromagnetic coil 256 surrounds the ball 250. It is embedded in a suitable insulating material 258. When the coil 256 is energized, ball valve element 250 acts as an electromagnetic core causing the spring 254 to compress. This increases the pressure in delivery passage 260.

Passage 242 communicates with passage 234 indicated in FIG. 4a. Thus, the magnitude of the pressure in passage 234 is related inversely and proportionately to the pressure in passage 204.

Ratio changes from low ratio to the intermediate ratio are cushioned by capacity modulator valve 236, which is supplied with fluid through feed line 238 when the transmission is operated in the second, third or fourth ratio. Line pressure is distributed through passage 238 to the 1-2 capacity modulator valve at a location intermediate lands 240 and 242, as seen in FIG. 4b. That valve includes a pressure regulating valve spring 244 which opposes feedback pressure distributed to the left side of the land 240 through feedback pressure passage 246. Intermediate clutch pressure is fed from the valve 236 through orifice 248 to the 1-2 accumulator 250, which includes an accumulator chamber defined in part by a piston 252, which is biased by accumulator piston spring 254. The pressure on the other side of the piston 252 is distributed to the accumulator 250 through passage 256.

The accumulator pressures for the 1-2 accumulator and the 3-4 accumulator are developed by the accumulator regulator valve 258. This comprises spaced lands 260, 262 and 264, lands 262 and 264 having a differential area which is subjected to pump pressure in passage 266. That passage communicates with passage 200 discussed with reference to FIG. 4a. A regulator spring 268 urges the regulator valve spool toward the right.

The regulated output pressure of the accumulator regulator 258 is line 270 which communicates with the spring side of the 3-4 accumulator and the 1-2 accumulator. Feedback pressure is distributed to the left side of the land 260 through passage 272. Land 262 registers with exhaust port 274, and land 260 registers with a port that communicates with passage 266, thereby providing each of these two accumulators 250 and 276 with a pressure that opposes a spring force, the accumulator pressure being delivered to the accumulator 276 as well as to the accumulator 250 through passage 278.

Forward clutch pressure is delivered from a forward clutch control, to be described subsequently, through line 280. This pressure shortens the spring 268 as front clutch pressure acts on the left side of the plunger 282. The stroke pressure for the 1-2 accumulator then will rise or fall, depending upon the magnitude of the line pressure in passage 280. This is illustrated in the chart in FIG. 5 where time is plotted against forward clutch pressure. During the initial time interval, the pressure rises until the intermediate clutch spring force is overcome. The piston for the clutch then will stroke, as indicated by the clutch stroke line. Clutch capacity increases as the pressure in the accumulator builds up against the opposing force of the spring. After the spring force and the pressure force of the accumulator regulator valve are overcome, the accumulator piston will begin to stroke following the accumulator stroke line of FIG. 5. After stroking is complete, the clutch pressure will rise sharply until line pressure is achieved in the clutch. The dashed stroke lines in FIG. 5 correspond to the dashed line pressure lines. As line pressure rises and falls, the stroke pressure will rise and fall accordingly.

Unlike the case of the front clutch pressure on a 1-2 shift, the 3-4 line pressure does not act on the plunger 282 to shorten the spring. Thus, it does not modify the output pressure in line 278 received by the 3-4 accumulator. Thus, the accumulator-regulator functions during a 3-4 shift as brake B1 becomes applied.

The 3-4 accumulator includes piston 296 and an accumulator spring 288 acting on the piston to supplement the force of the accumulator-regulator pressure supplied to tee 3-4 accumulator to passage 278.

Overdrive servo pressure is supplied to the overdrive servo B1 through line 290. The pressure in passage 290, after passing through orifice 292, is transmitted to the upper side of the piston 296 of the 3-4 accumulator.

Neutral-to-drive engagements are regulated by 2-1 downshift control 298. This control comprises valve spool 300 situated in a valve chamber and includes a valve that is urged in a right-hand direction by valve spring 302. It is urged in a left-hand direction by throttle valve pressure which acts on the right side of land 304.

During a 2-1 downshift, the intermediate clutch exhaust flow path from the intermediate clutch includes line 304. If the 2-1 downshift is a power-on downshift, throttle pressure is sufficient to move the valve to the left, allowing intermediate clutch exhaust fluid to exhaust through exhaust port 306. If the 2-1 downshift is a coasting downshift, the valve 300 will assume the position shown in FIG. 4b, and line pressure from line pressure passage 310 passes through orifice 312 as line pressure is fed through the engagement valve to be described subsequently. Thus, a second orifice is introduced during a power-on downshift, the first orifice in the intermediate clutch exhaust flow path being orifice 314 and the second orifice being orifice 317 in FIG. 4c.

This allows the intermediate clutch to be applied more quickly than in the case of a coasting 2-1 downshift.

Shown in FIG. 4b is a pressure failsafe valve 315 which comprises a simple shuttle valve spool 316 having spaced valve lands 318 and 320. Valve spring 322 urges the spool 316 in a right-hand direction, as viewed in FIG. 4b.

When the valve spool 316 is positioned as shown in FIG. 4b, converter regulator output pressure in passage 324 communicates directly with TV passage 326. This pressure acts on the left side of throttle booster valve element 196 of the main regulator valve assembly described with reference to FIG. 4a.

During normal operation, variable force solenoid pressure is distributed to the right end of land 320 through passage 328. This pressure is developed by variable force TV solenoid valve 330 shown in FIG. 4a. Under the influence of variable force solenoid pressure, valve element 316 is shifted to the left, thereby establishing communication between passage 326 and passage 328 so that line pressure can be distributed to the booster element of the main regulator valve assembly of FIG. 4a. Thus, if the variable force solenoid circuit should fail for some reason, or if the valve should stick and become nonfunctional, line pressure will be boosted to a maximum by the main pressure regulator valve as converter regulator output pressure is substituted for TV pressure at the booster valve element 196.

Figures 10, 11:
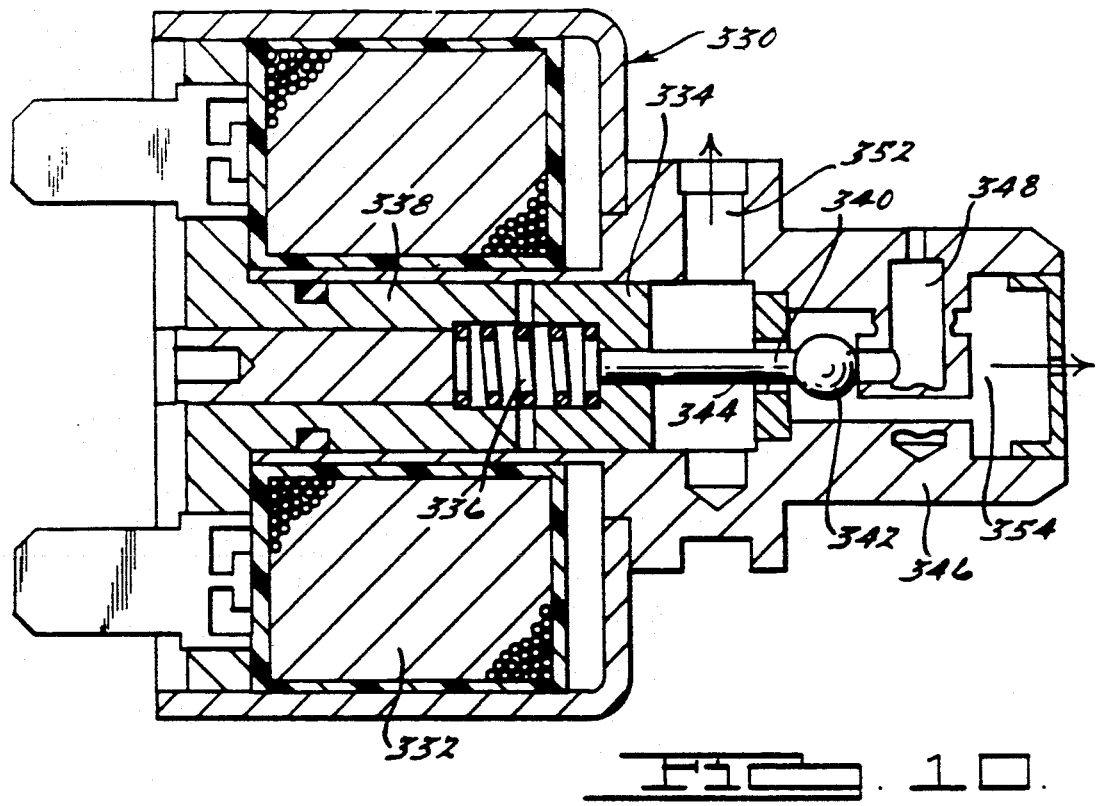
FIG. 10 is a cross-sectional view of a variable force throttle valve assembly.
FIG. 11 is a chart showing the engagement state of the three solenoid valves of FIG. 4c during each drive range and gear ratio.

The variable force solenoid 330 of FIG. 4b is shown in more particular detail in FIG. 10. It includes a solenoid assembly 330 comprising solenoid windings 332 and an armature 334. A valve spring 336 acts between the stationary portion 338 of the solenoid assembly and the armature 334. A valve actuator pin 340 is carried by the armature 334 and is adapted to engage ball valve 342. Ball valve 342 registers with orifice 344 located in valve housing 346.

The variable force TV solenoid valve has a feed port 348 which communicates with converter regulator pressure line 350, as seen in FIG. 4a. Numeral 352 designates an exhaust port in the VFS TV solenoid valve body. It communicates with the orifice 344.

Ball valve 342 is located on the feed side of orifice 344. A signal passage 354 is located on the feed side of orifice 344.

Normally, plunger or armature 334 and the pin 340 will unseat valve 342 from the orifice 344 under the influence of the force of spring 336. If current is applied to the solenoid, the valve will become seated as the armature 334 is subjected to the electromagnetic force that opposes the spring force. This is accompanied by an increase in the pressure in the signal passage 354. The valve becomes unseated as voltage to the solenoid windings is decreased. As the current for the solenoid increases, the ball valve 342 will tend to seat against its orifice, thereby causing a pressure increase in the signal passage 354. Signal passage 354 communicates with variable force solenoid passage 356 which communicates with passage 328 in FIG. 4b.

Throttle valve pressure is distributed to passage 326 and to the main pressure regulator as explained previously. The same pressure is distributed through ball valve 358, as seen in FIG. 4b and to TV pressure passage 360, which acts on the right end of engagement valve 362 shown in FIG. 4d.

Figure 3A:
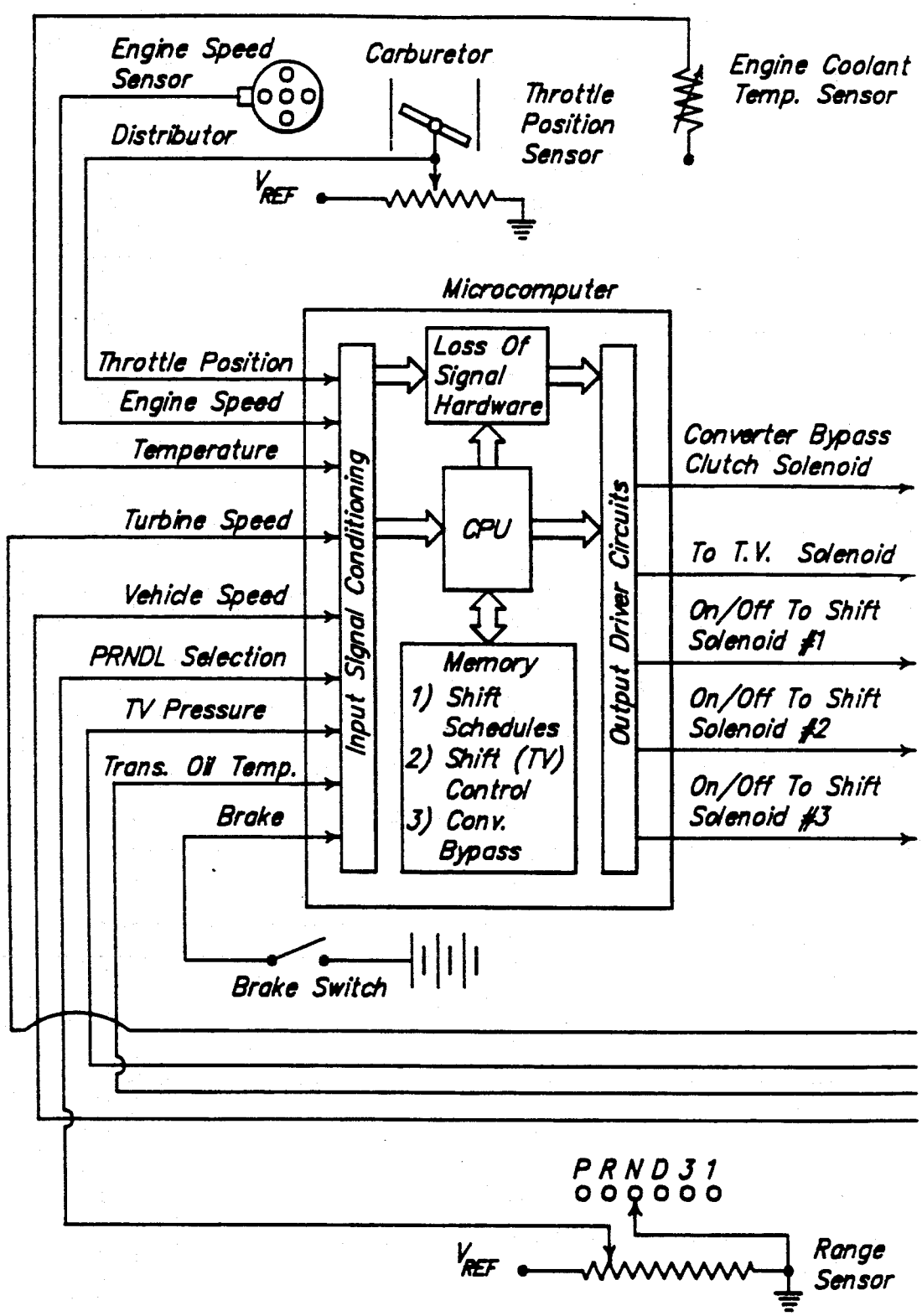

FIG. 3 shows a schematic diagram of the microcomputer circuit and valve system. The various sensors provide signals for the microcomputer which are received by the input signal conditioning portion of the microcomputer. The shift schedules and the pressure control schedules are stored in the memory portion. The memory registers are addressed by the control processing portions after computations are made using the input signals as variables. The output driver circuit receives the result of the computations and develops output signals for the electrohydraulic controls including the three solenoid valves, the VFS TV solenoid and the bypass clutch solenoid.

The Control Valve Circuit Of FIG. 4d

Engagement valve 362 comprises lands 364 and 366 which may be of equal diameter It is urged in the right-hand direction by valve spring 368.

On a neutral-to-drive shift of the manual valve, pump pressure in passage 200 will be distributed to passage 370 to the forward clutch control valve 372. Forward clutch control valve 372 comprises a valve spool having lands 374 and 376. When the valve 372 moves to the right position against the opposing force of spring 382, line pressure from passage 370 will be delivered directly to passage 378 and through 3-4 shift valve 388 to the front clutch feed passage 390. Orifice 392 is located in feed passage 390 to cushion the engagement of the forward clutch CL1. The valve assumes the right-hand position, as seen in FIG. 4d, as pressure in passage 384 acts on the differential area of lands 374 and 386. Passage 384 receives its pressure from the three-position check valve 394 which communicates through the check valve with line pressure passage 396.

As the forward clutch becomes pressurized, pressure builds up in passage 378, which is transferred through line 280 to the orifice 398 in FIG. 4b, thus shifting the spring seat 382 of the accumulator-regulator valve. This shortens the accumulator valve spring, as explained previously. A coasting 2-1 downshift results in a pressure build-up in passage 399 which communicates with the neutral drive accumulator, as indicated in FIG. 4b.

This accumulator comprises a piston 400 with an accumulator chamber spring 402 and an accumulator volume 404. Line pressure for the low-and-intermediate servo B2 acts on the upper end of the piston 400 and cushions the engagement of the servo as pressure is delivered to the apply side of servo B2 through the engagement valve 362. During a coasting 3-2 downshift, it is necessary for the brake servo B2 to become applied. The 2-3 servo regulator 406 acts as a regulator valve in this instance as fluid is delivered to the apply side of the brake servo B2 through the engagement valve 362, which is shifted to the left by line pressure in line 360, which is moved to the left by pressure in passage 360.

Figure 5:
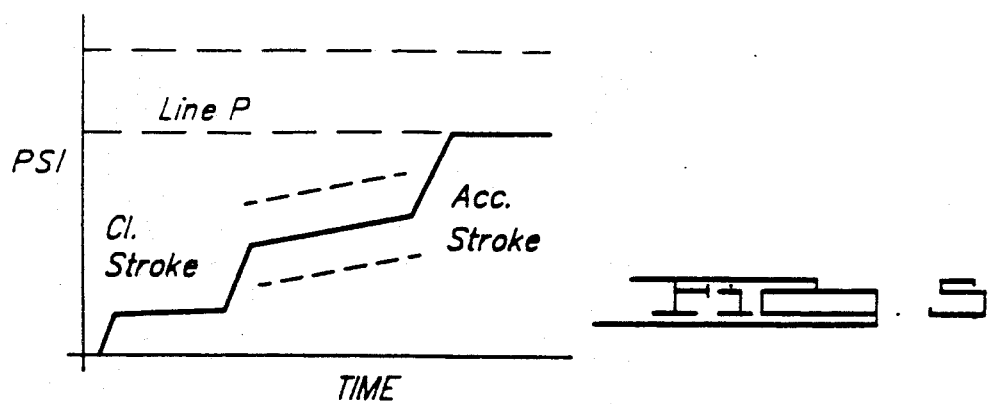
FIG. 5 is a chart showing the relationship between intermediate clutch servo pressure and time during a ratio change from a low ratio to the intermediate ratio.

There is no line pressure in passage 408 at the beginning of a coasting 3-2 downshift. Thus, the valve 406 may act as a regulator valve on a coasting 3-2 downshift. The feedback pressure for the differential area of lands 410 and 412 communicates with feedback passage 414. The relationship between time and servo pressure in this instance is illustrated by the chart of FIG. 5. After the downshift is completed, the control strategy for the solenoid 464 in FIG. 4c will delay turning on the solenoid. After the coasting downshift is done, the solenoid is turned on.

On a torque demand 3-2 downshift, line pressure is present in line 408. This line pressure from line 494 passes directly through the valve 406 and through the engagement valve to the apply side of servo B2.

Figure 6:
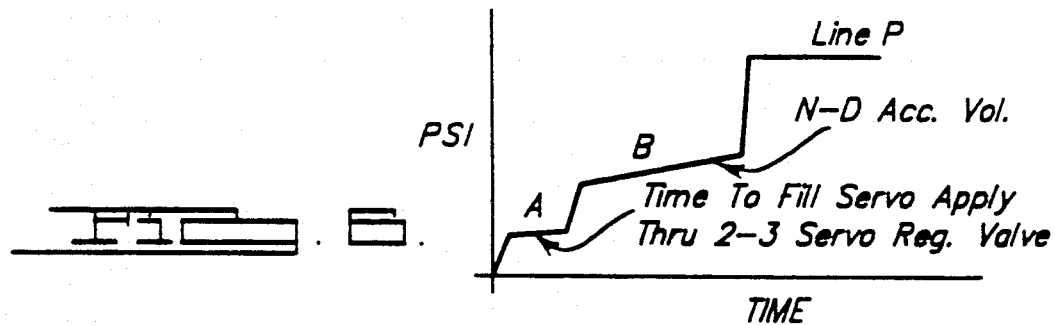
FIG. 6 shows the relationship between the low-and-intermediate servo pressure and time during a transition from neutral to the drive condition.
Figure 7:
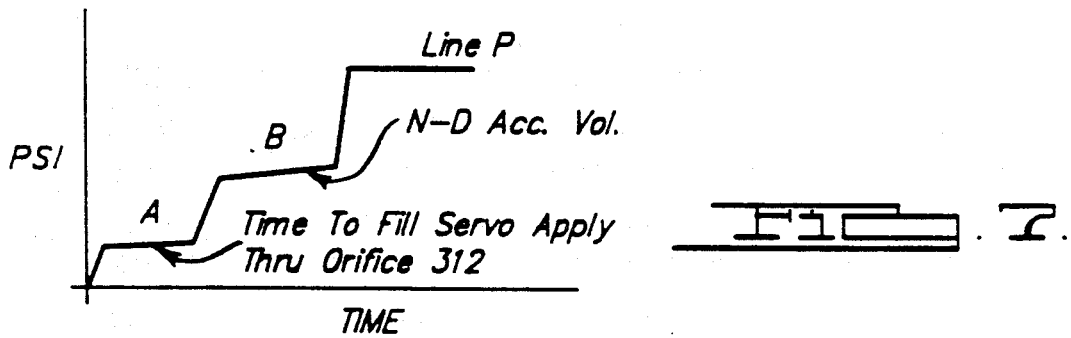
FIG. 7 is a chart showing the relationship between the low-and-intermediate servo release pressure and time during a downshift from the direct-drive ratio to the intermediate ratio.

In FIG. 6, the portion of the curve representing the low-and-intermediate servo engagement shown at A is the pressure build-up rate due to the cushion spring in the servo. The portion of the curve represented by the symbol B is that characteristic that is due to the neutral-drive accumulator volume. After the line 416 exhausted, the servo pressure will rise to a maximum pressure corresponding to line pressure. FIG. 7 shows the corresponding time versus servo pressure relationship when the servo is fed through orifice 312. In this instance, the fill time is less. Thus, the portion of the curve shown at B is shorter than the corresponding portion of the curve of FIG. 6.

On a 3-2 shift, as the servo B2 becomes applied, fluid is released from the release side of the servo. The release fluid passes through line 416 to the 3-2 shift timing valve shown at 418 in FIG. 4d. The valve 418 includes three spaced valve lands of equal diameter, as shown at 420, 422 and 424. When the valve is positioned as shown, line 416 communicates with passage 432 which has in it orifice 446. Passage 432 extends to the direct clutch exhaust line.

On a 3-2 downshift at high speeds, the timing valve 418 will be moved to the right. This is accomplished by pressurizing passage 427 by solenoid valve 428. This also pressurizes the left end of the forward clutch valve 370 causing it to shift to the right and to connect pump pressure line 372 to the forward clutch feed line 390 through the 3-4 shift valve. The release side of brake B2 then is exhausted through passage 416 and through orifice 430 in the line 432. Fluid from the working chamber of the direct clutch CL3 then is discharged through orifice 445 as well as orifice 444 in the 1-2 shift valve, which communicates with orifice 445 through line 447. Line 432 extends through check valve 434 to line 436 and through check valve 438 to line 440. This line extends to the 1-2 shift valve 482 at land 442 which, under these conditions, assumes a left-hand position shown in FIG. 4c. Line 440 then is exhausted through orifice 444 to the reservoir.

Figure 7A:
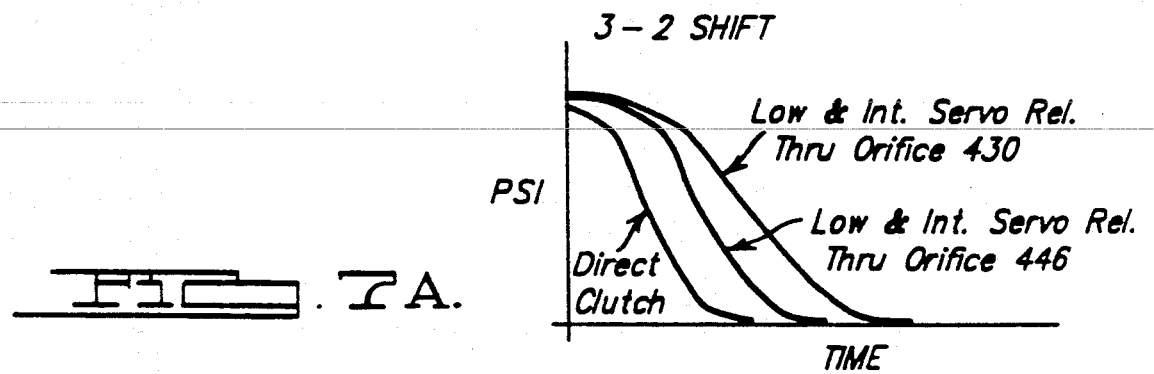
FIG. 7A is a chart showing the decay time for a 3-2 downshift.

Orifice 430 is larger than companion orifice 446. At low speeds, the shift timing valve 418 is in the position shown. Thus, the line 416 is exhausted through orifice 446 rather than orifice 430. Thus, the decay time is greater, as indicated in the chart of FIG. 7a. In the case of a 3-2 shift at high speeds, with the valve 418 in the right-hand position, a part of the direct clutch exhaust flow occurs through secondary orifice 446 in the 3-2 shift timing valve. This further reduces the shift timing. In the chart of FIG. 7a, there is shown also a decay curve for the pressure in the direct clutch as well as the corresponding curves illustrating the rate of decay of the pressure on the low-and-intermediate servo release.

Referring again to FIG. 4a, the solenoid regulator valve 448 includes three lands 450, 452 and 456, the latter registering with exhaust port 458. Valve 448 is biased in a right-hand direction by valve spring 460. Line pressure from passage 164, which is pressurized during second, third and fourth ratio is distributed to the valve 448. That pressure is regulated at a constant value by the valve 448 which distributes pressure to the intake side of the bypass clutch solenoid described with reference to FIG. 9. The output from the bypass clutch solenoid 236 is delivered to the bypass clutch control through passage 234, as previously explained.

Regulated converter pressure is delivered to passage 460 which feeds the TV solenoid 330, and each of the shift solenoids 462 and 464 in addition to the third solenoid 428 described previously. Each of the solenoids 462, 464 and 428 is normally open. When they are not energized, solenoid feed pressure is delivered directly from passage 460 to signal passages 466, 468 and 426, respectively. The solenoids are on-off solenoids. Flow from the feed passage 460 to each of the signal passages is interrupted when they are energized.

Figure 8:
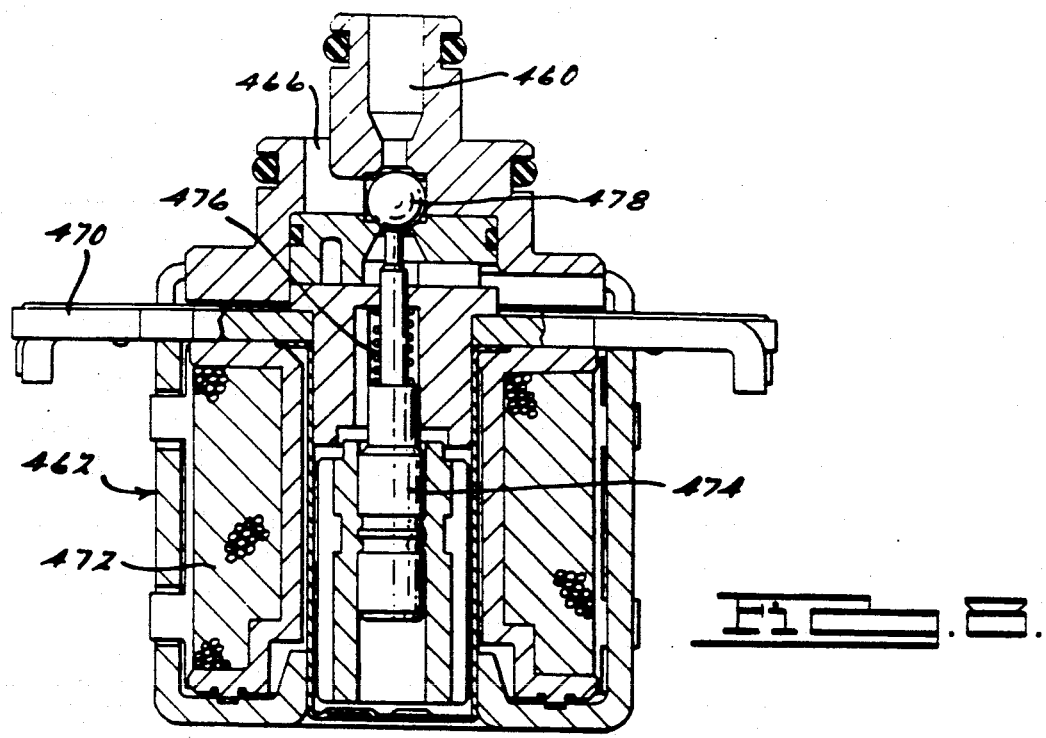
FIG. 8 is a cross-sectional view of a typical solenoid valve assembly for controlling ratio changes and for controlling engagement and release pressures.

FIG. 8 shows an enlarged cross-sectional view of the solenoid 462. Each of the other solenoids is similar.

Solenoid 462 comprises a mounting plate 470, solenoid coil 472, an armature 474 and a spring 476 surrounding the armature to normally bias the armature out of engagement with solenoid ball valve element 478, thus opening the flow passage from line 460 to 466. When the solenoid windings are energized, the armature closes the valve element 478 against the valve seat defining in part passage 460.

Solenoid valve 428 provides a signal in passage 426 which is distributed to the left end of land 424 of the 3-2 shift timing valve 418. The solenoid under the control of the microprocessor then will actuate the valve so that a selection may be made for the large orifice 432 or the smaller orifice 446. This distinguishes between the high speed 3-2 shift timing requirement and a low speed shift timing requirement as explained previously.

Solenoid 428 supplies also a signal to the left end of land 386 of the forward clutch control valve 372. This is done in order to provide engine braking in third gear which requires application of the forward clutch. The differential area of lands 374 and 386 is not pressurized, as explained previously, during operation in third gear and overdrive.

Control Valve Circuit Of FIG. 4c

The ratio changes in the transmission are under the control of the 2-3 shift valve, the 1-2 shift valve, the intermediate clutch shuttle valve, the 3-4 shift valve and the pull-in valve. These valves are respectively identified by reference numerals 480, 482, 484, 486 and 488. Each of these valves is a shuttle valve and can assume either one position or the other depending upon whether a solenoid pressure signal is available. These valves are under the control of only two solenoids, namely, solenoids 462 and 464. Thus, ratio changes between each of the four ratios can occur as each of the individual valves performs multiple functions. The 2-3 shift valve has a solenoid valve pressure land 490, which is pressurized by solenoid valve pressure from solenoid 464. That pressure is distributed to the 2-3 shift valve through passage 468. Valve 480 includes a valve spring 492 which moves it to the left when a solenoid valve signal in passage 468 is absent.

Line pressure exists in passage 494 when the manual valve is in the overdrive position, the D position, or the 1 position. Valve lands 496 and 498 on the 2-3 shift valve establish communication between passage 494 and passage 500 when valve 480 is shifted in a right-hand direction against the force of spring 492. When the valve 480 assumes the position shown in FIG. 4c, passage 500 communicates with exhaust port 502.

The solenoid valve 464 will develop a pressure in passage 468 that shifts the valve to the right to condition the transmission for operation in third and overdrive ratios. During operation in the first and intermediate ratios, spring 492 urges the valve 480 in a left-hand direction. When the valve 480 is in the left-hand position, passage 500 is exhausted through port 502 and the passage 494 communicates with passage 504, which is connected to passage 408 as seen in FIG. 4d.

The 1-2 shift valve 482 assumes the position shown in FIG. 4c during operation in the second and the fourth ratios During operation in the first and third ratios, it is shifted to the right. The shifting movement is established as the valve 482 responds to a signal in passage 466 from the solenoid valve 462. The signal acts on the left side of land 506. Valve spring 508 normally shifts the valve 482 in a left-hand direction.

Valve 482, in addition to land 506, includes lands 510, 514 and previously described land 442. When the valve is positioned as shown in FIG. 4c, the direct clutch apply pressure in passage 518 is exhausted through exhaust port 520. When the valve 482 is shifted in a right-hand direction, line pressure passes directly from passage 522 to the direct clutch feed passage 518 whenever passage 522 is subjected to line pressure. That condition exists when the manual valve is shifted to a manual low range position.

When the valve 482 is positioned to the left, as shown in FIG. 4c, communication is established direction between line pressure supply passage 524 and passage 526, the latter extending to the shuttle valve 484. Passage 524 is connected to passage 148 shown in FIG. 4a whenever the manual valve is in the overdrive position, the drive position D or the manual low position. Passage 526 is exhausted through exhaust port 528 when the valve 482 is shifted in a right-hand direction during operation in the first and third ratios.

When the valve 482 is shifted in a left-hand direction, communication is established between feed passage 530 for the 3-4 shift valve and passage 532, which communicates with passage 500 described previously. Passage 532 serves as a feed passage for the intermediate clutch shuttle and the 3-4 shift valve. Passage 530, which is a signal passage for the 3-4 shift valve, communicates with exhaust orifice 444 through the 1-2 shift valve when the shift valve is shifted in a right-hand direction. When it is in that position, passage 532, which communicates with the line pressure passage 494 through the 2-3 shift valve, communicates with passage 440 which applies line pressure to the direct clutch CL3 through one-way check valve 534 as shown in FIG. 4c.

When passage 526 is pressurized as the 1-2 shift valve moves to the left-hand position during operation in the second and fourth ratios, the intermediate clutch shuttle valve 484 will be shifted to the right as land 536 becomes pressurized. Intermediate clutch shuttle valve 484 includes, in addition to the land 536, lands 538 and 540 which establish communication between intermediate clutch exhaust passage 542 and line pressure feed passage 544. Passage 544 is connected to passage 164, which is pressurized during operation in the second, third and fourth ratio.

The release side of the low-and-intermediate servo B2 is exhausted through orifice 317 and one-way check valve 546 when the transmission is conditioned for operation in the second, third and fourth ratios. If the shuttle valve is shifted to the right, passage 544 is connected to line pressure feed passage 548. This feed passage is connected to passage 148 described with reference to the manual valve of FIG. 4a.

The intermediate clutch shuttle valve thus will interrupt the supply of line pressure to passage 544 and prevent application of the low-and-intermediate servo whenever the solenoid valve signal for solenoid valve 462 is exhausted from passage 466. That corresponds, as explained previously, to the position of the 1-2 shift valve shown in FIG. 4c.

The 3-4 shift valve 486, in addition to the land 388, includes valve lands 550, 552 and 554. The 3-4 shift valve 486 is urged in the left-hand direction by a valve spring 556. The corresponding valve spring for the intermediate clutch shuttle valve is shown at 558. The overdrive servo B1, which is supplied through passage 290 as explained previously, is exhausted through control orifice 558 when the 3-4 shift valve is positioned as shown. This releases the overdrive brake B1.

Passage 290 is connected to passage 532 when the 3-4 shift valve is shifted in a right-hand direction. Passage 532 is pressurized, as explained previously, during operation in the third and fourth ratios. This causes the overdrive brake servo to become applied. The 3-4 shift valve can be shifted in the right-hand direction only if passage 530 is pressurized, and that occurs only when the 1-2 shift valve is in the left-hand position, thereby permitting distribution of line pressure from passage 532 through the 1-2 shift valve.

During operation in reverse, the 3-4 shift valve 486 is shifted in a right-hand direction under the force of the reverse line pressure in passage 560, which acts on the differential area of lands 554 and 552. This allows reverse line pressure from passage 560 to pass directly through the 3-4 shift valve to the front clutch feed passage 390.

Pull-in valve 488 is available to supply a shift signal for the 1-2 shift valve and the 2-3 shift valve if the control system should lose power, thereby rendering solenoid valves 462 and 464 inoperable. These are normally open valves, so if a power failure occurs, converter regulator output pressure in passage 350 will pass directly into lines 466 and 468. This normally would shift the 2-3 shift valve in a right-hand direction and will shift the 1-2 shift valve 482 in a right-hand direction against the opposing force of their respective springs As soon as the operator is aware of a power failure, he may move the manual valve to the "1" position whereby regulated pump pressure is delivered to line 562. This pressure is delivered to passage 564 and to the right side of land 566 of the pull-in valve.

The pull-in valve comprises, in addition to the land 566, a land 568. A valve spring 570 normally urges the pull-in valve to the right Signal passage 468 communicates with the pull-in valve; and when the valve assumes the position shown, land 568 blocks passage 468. At the same time, signal passage 572 is exhausted through exhaust port 574. When the operator pulls the manual valve to the manual low range position, line pressure will be distributed to the right side of the land 566 and shift the valve 488 in a left-hand direction, thereby blocking exhaust port 574 and opening passage 468 to passage 572. Thus, a new signal passage is made effective. That signal passage identified by numeral 572 distributes line pressure to a spring chamber for spring 508 of the 1-2 shift valve and to the spring chamber for spring 492 of the 2-3 shift valve. This returns each of the shift valves to their left-hand positions. Thus, the transmission will be conditioned for continuous operation in the intermediate speed ratio. In an emergency, therefore, the vehicle operator may drive the vehicle in intermediate ratio to a service center where the voltage failure can be repaired.

SUMMARY OF THE INVENTION

For the purpose of summarizing the valve functions during operation in each of the four forward driving ratios and the single reverse ratio, the following overview is provided.

If the manual valve is shifted to the overdrive position, pump pressure will be distributed to passage 148. Pump pressure also is applied to passage 150 which pressurizes passage 370. This supplies pump pressure to the forward clutch control 372.

The 2-3 shift valve is shifted to the left under the influence of its valve spring 492. Line pressure from pressurized passage 148 then is distributed through the 2-3 shift valve between the lands 490 and 496 to passage 504. Line pressure then passes through check valve 438 as passage 408, which communicates with passage 504, becomes pressurized.

Check valve 394 connects passage 396 with passage 384, thus causing the forward clutch control valve 372 to be shuttled to the right. Pump pressure in passage 370, which communicates with passage 150, then communicates with passage 380. This supplies the forward clutch through the 3-4 shift valve, which is in the left-hand position at this time.

Passage 396 feeds orifice 312, the downstream side of which communicates with the neutral-to-drive accumulator and passage 398 which feeds the engagement valve 362. Line pressure passes through the engagement valve to the apply side of the low-and-intermediate brake servo B2. With the low-and-intermediate brake servo and the forward clutch thus applied, the transmission is condition for operation in the first ratio.

A shift from the first ratio to the second ratio occurs as line pressure is distributed from passage 524 and through the 1-2 shift valve, which is in the left-hand position as explained previously. Line pressure then passe from the passage 524 through the 1-2 shift valve to passage 526, which triggers the intermediate clutch shuttle valve, pushing it to the right. This allows line pressure to be transferred from passage 548 to passage 544. The 1-2 capacity modulator valve communicates with passage 544 through passage 238. Line pressure passes through valve 236 and pressurizes passage 246, thus engaging the intermediate clutch CL2. The servo B2 remains applied as previously explained with reference to operation in the first ratio.

A ratio change from the second ratio to the third ratio when the manual valve is in the OD position occurs as the 2-3 shift valve is shifted in a right-hand direction as explained previously. Line pressure then is delivered from passage 494 to passage 500. The 1-2 shift valve is shifted in a right-hand direction, as explained previously. This causes pressurized passage 500 to deliver pressurized fluid to passage 440, which is connected through the check valve 438 to passage 582. That passage is in communication with the direct drive clutch CL3 through check valve 534. Direct clutch pressure is distributed also to line 432 and through check valve 584 to the release side of the low-and-intermediate brake servo B2. With the direct clutch applied and the low-and-intermediate servo released, and with the intermediate clutch remaining applied, the transmission is conditioned for direct-drive operation.

If it is desired to have coast braking in direct drive ratio, the manual lever may be shifted to the D position, thereby pressurizing passage 596. Line pressure is then delivered from line 596 to line 588, as shown in FIG. 4d. This pressure then passes through the forward clutch control valve to passage 380 which supplies the forward clutch feed passage 390. With all three clutches applied, the transmission is conditioned for coast braking with the transmission in the direct-drive condition.

Orifice 592 is provided in passage 588 in order to control manual 4-3 downshifts as the manual valve is moved from the OD position to the D position. When fluid is delivered in the opposite direction, one-way check valve 594 bypasses the orifice 592.

When a shift to the fourth ratio from the third ratio is desired, the 2-3 shift valve remains in the right-hand position, and the 3-4 shift valve is shifted in a right-hand direction. Thus, line pressure is transferred from passage 494 to passage 532 and then to the 3-4 shift valve. The 3-4 shift valve is shifted in a right-hand direction as explained previously during operation in the fourth ratio. Thus, line pressure is transferred from passage 532 to passage 290. It then passes through the check valve 438 to direct clutch feed passage 582. Fluid is transferred also to passage 432 by the check valve 534 and through check valve 584 to the release side of the low-and-intermediate servo B2.

Pressurized passage 290 communicates with the overdrive servo B1 through orifice 292 and to the pressure side of the 3-4 accumulator. With both the direct clutch applied and the overdrive servo applied, the transmission is conditioned for overdrive operation.

Reverse drive is obtained by moving the manual valve to the reverse position, which causes line pressure to be distributed to passage 560, through the check valve 394 and then to passage 384. This causes the forward clutch control valve to be shifted to the right. This results in a direct connection between pump pressure passage 370 and passage 380 which feeds the forward clutch CL1 through the 3-4 shift valve and the feed passage 390. The reverse clutch CL4 is applied because of the direct connection between passage 560 and the reverse clutch feed orifice 600.

On a neutral to manual low engagement, the manual valve is moved to the "1" position as in the case of a pull-in shift. Line pressure in passage 562 then is passed directly to the 2-3 servo regulator valve 406 in FIG. 4d. At that time, the 2-3 servo regulator valve spool is in a left position because of line pressure in line 504. Line pressure in passage 408 is not developed instantaneously upon movement of the manual valve because of the time lag due to the stroking of the servo piston. Thus, the servo B becomes applied together with the forward clutch CL1, which is pressurized as explained previously with respect to the low ratio operation with the manual valve in the OD position.

During operation in reverse, reverse line pressure is delivered to the reverse boost valve element for the main regulator as explained previously. If there is a failure in the variable force solenoid, the pressure failsafe valve 315 will move to the right under the influence of spring 322, thereby connecting booster passage 326 with converter regulator pressure passage 324. Regulated converter pressure then is substituted for throttle valve pressure on the boost valve element 196 of the main regulator valve, thereby preserving line pressure.

We have shown in FIG. 11 a chart that shows the conditions under which the three solenoids 462, 464 and 428 are energized. As explained previously, when one of these solenoids is energized, the valve is closed, thereby interrupting a signal to the signal passages 466, 468 and 427, respectively.

Having described a preferred embodiment of the invention, what we claim and desire to secure by U.S. Letters Patent is:

1. An automatic transmission control system comprising multiple ratio planetary gearing, fluid pressure operated clutch and brake means for establishing multiple speed ratio changes in said gearing, a pressure source;

control valve circuitry connecting said pressure source with said clutch and brake means including multiple shift controlling valve means, multiple solenoid valve means forming a part of said circuitry, each multiple solenoid valve means including a valve element connecting a high pressure portion of said circuitry to a first of said multiple shift controlling valve means in said circuitry and adapted to open and close a fluid pressure connection between said first shift controlling valve means and said high pressure portion as it changes between open and closed operating states;

each shift controlling valve means having multiple shift functions and being adapted to shift in one direction selectively to establish a first set of operating conditions and in the opposite direction to establish a different set of operating conditions;

means for normally holding said shift controlling valve means in one position when its associated solenoid valve means is in a first operating state;

each of said multiple shift controlling valve means establishing and disestablishing fluid pressure delivery paths between it and other shift controlling valve means whereby two solenoid valve means are adapted to trigger a larger number of shift controlling valve means as fluid pressure is transferred from said multiple shift controlling valve means selectively to said fluid pressure operated clutch and brake means.

2. An automatic transmission control system comprising planetary gearing, fluid pressure operated clutch and brake means for controlling the relative motion of elements of said gearing, a pressure source, fluid pressure passages between said pressure source and said clutch and brake means;

first and second shift valve means communicating with said passages for establishing respectively ratio changes between first and second ratios and between second and third ratios;

a first solenoid valve means for triggering shifting movement of said first shift valve means and a second solenoid valve means for triggering shifting movement of said second shift valve means;

third shift valve means communicating with said passages for establishing ratio changes between third and fourth ratios;

a fluid connection between said first shift valve means and said third shift valve means for delivering a valve actuating pressure to said third shift valve means to move the latter to a fourth ratio position when said first shift valve means is in its third ratio position.

3. An automatic transmission control system comprising multiple ratio planetary gearing, fluid pressure operated clutch and brake means for establishing multiple speed ratio changes in said gearing, a pressure source;

control valve circuitry connecting said pressure source with said clutch and brake means including multiple shift controlling valve means, multiple solenoid valve means forming a part of said circuitry, each multiple shift controlling valve means including a valve element connecting a high pressure portion of said circuitry to multiple shift controlling valve means in said circuitry and adapted to open and close a fluid pressure connection between said shift controlling valve means to said high pressure portion as it changes between open and closed operating states;

each shift controlling valve means having multiple shift functions and being adapted to shift in one direction selectively to establish a first set of operating conditions and in the opposite direction to establish a different set of operating conditions;

means for normally holding said shift controlling valve means in one position when its associated solenoid valve means is in a first operating state;

said multiple shift controlling valve means establishing and disestablishing fluid pressure delivery paths therebetween and between them and other shift controlling valve means whereby two solenoid valve means are adapted to trigger a larger number of shift controlling valve means as fluid pressure is transferred from said multiple shift controlling valve means to said fluid pressure operated clutch and brake means;

intermediate ratio shuttle valve means in said circuitry in fluid communication with one of said shift controlling valve means for distributing actuating pressure to the fluid pressure operated clutch and brake means corresponding to speed ratios higher than the lowest of said ratios whereby said one shift controlling valve means triggers actuation of said shuttle valve means when it assumes its higher ratio position.

4. An automatic transmission control system comprising planetary gearing, fluid pressure operated clutch and brake means for controlling the relative motion of elements of said gearing, a pressure source, fluid pressure passages between said pressure source and said clutch and brake means;

first and second shift valve means communicating with said passages for establishing respectively ratio changes between first and second ratios and between second and third ratios;

a first solenoid valve means for triggering shifting movement of said first shift valve means and a second solenoid valve means for triggering shifting movement of said second shift valve means;

third shift valve means communicating with said passages for establishing ratio changes between third and fourth ratios;

a fluid connection between said first shift valve means and said third shift valve means for delivering a valve actuating pressure to said third shift valve means to move the latter to a fourth ratio position when said first shift valve means is in its second ratio position;

intermediate ratio shuttle valve means communicating with one of said shift controlling valve means for controlling distribution of actuating pressure to the fluid pressure operated clutch means corresponding to speed ratios higher than the lowest of said ratios whereby said one shift controlling valve means triggers actuation of said shuttle valve means when it assumes its fourth ratio position.

5. An automatic transmission control system comprising multiple ratio planetary gearing, fluid pressure operated clutch and brake means for establishing multiple speed ratio changes in said gearing, a pressure source;

control valve circuitry connecting said pressure source with said clutch and brake means, multiple solenoid valve means forming a part of said circuitry and including a valve element connecting a high pressure portion of said circuits to multiple shift controlling valve means in said circuitry and adapted to open and close a fluid pressure connection between said shift controlling valve means to said high pressure portion as it changes between open and closed operating states;

each shift controlling valve means having multiple shift functions and being adapted to shift in one direction selectively to establish a first set of operating conditions and in the opposite direction to establish a different set of operating conditions;

means for normally holding each of said shift controlling valve means in one position when its associated solenoid valve means is in a first operating state;

said multiple shift controlling valve means establishing and disestablishing fluid pressure delivery paths therebetween and between them and other shift controlling valve means whereby two solenoid valve means are adapted to trigger a larger number of shift controlling valve means as fluid pressure is transferred from said multiple shift controlling valve means and said other shift controlling valve means;

intermediate ratio shuttle valve means in said circuitry in fluid communication with one of said shift controlling valve means for distributing actuating pressure to the fluid pressure operated clutch and brake means corresponding to second, third and fourth speed ratios whereby said one shift controlling valve means triggers actuation of said shuttle valve means when it assumes its second ratio position; and forward clutch control valve means communicating with one of said shift controlling valve means for distributing actuating pressure to the fluid pressure operated clutch and brake means corresponding to a direct drive speed ratio and a third solenoid valve means for triggering actuation of said shuttle valve means whereby fourth speed ratio is inhibited.

6. A planetary gear transmission control system having gear elements defining four forward driving gear ratios, clutch and brake means for controlling ratio changes in said gear elements, a pressure source, a valve circuit including said pressure source and fluid pressure operated clutch servos and brake servos for actuating said clutches and brakes;

multiple shift valve means in said circuit for controlling distribution and release of actuating pressure to and from said servos;

multiple solenoid valve means including a regulated solenoid pressure source in said circuit for developing pressure signals, said shift valve means communicating with said solenoid valve means and responding to said signals to effect application and release of said servos;

one of said brake servos being applied for low ratios and being released for an intermediate ratio and having a servo release pressure chamber and a servo apply pressure chamber; and a servo regulator valve means in said circuit for supplying a regulated pressure to said apply chamber during operation in intermediate ratio, and for regulating release of fluid from said apply chamber when said one brake servo is released during a ratio change from intermediate ratio to a higher ratio.

7. A planetary gear transmission control system having gear elements defining four forward driving gear ratios, clutch and brake means for controlling ratio changes in said gear elements, a pressure source, a valve circuit including said pressure source and fluid pressure operated clutch servos and brake servos for actuating said clutches and brakes;

multiple shift valve means in said circuit for controlling distribution and release of actuating pressure to and from said servos;

multiple solenoid valve means including a regulated solenoid pressure source in said circuit for developing pressure signals, said shift valve means communicating with said solenoid valve means and responding to said signals to effect application and release of said servos;

one of said brake servos being applied for low ratios and being released for an intermediate ratio and having a servo release pressure chamber and a servo apply pressure chamber;

a servo regulator valve means in said circuit for supplying a regulated pressure to said apply chamber during operation in intermediate ratio, and for regulating release of fluid from said apply chamber when said one brake servo released during a ratio change from intermediate ratio to a higher ratio; and a shift timing valve means in said circuit communicating with said release chamber of said one brake servo for controlling the rate of discharge of fluid from said release chamber on a coasting downshift ratio change from said higher ratio to said intermediate ratio.

8. The combination as set forth in claim 7 wherein said shift timing valve means comprises a shiftable valve spool and a pair of fluid flow orifices in a servo release pressure passage connected to said release chamber;

said valve spool, upon shifting movement thereof, blocking one orifice of said pair when it shifts in one direction and blocking the other orifice of said pair when it shifts in the opposite direction; and an additional solenoid valve means for developing a speed dependent pressure signal that acts on said valve spool and triggers shifting movement thereof when said speed dependent signal is present whereby the rate of release of fluid from the release side of said one brake servo is more rapid at high speeds.

9. The combination as set forth in claim 7 wherein said circuit includes a low and intermediate pressure line communicating with said shift valve means and said servo regulator valve means for interrupting the regulating action thereof on a non-coasting downshift ratio change from said higher ratio to said intermediate ratio.

* * * * *

UNITED STATES PATENT AND TRADEMARK OFFICE
CERTIFICATE OF CORRECTION

PATENT NO. : 5,081,886
DATED : January 21, 1992
INVENTOR(S) : Dennis W. Person, et al It is certified that error appears in the above-identified patent and that said Letters Patent is hereby corrected as shown below:

Column 3, line 67, after "chambers" insert a period (.).
Column 3, line 68, after "released" insert a period (.).
Column 5, line 1, after "point" insert a period (.).
Column 8, line 44, delete "tee" and substitute --the--.
Column 10, line 14, after "diameter" insert a period (.).
Column 11, lines 45-46, after "chart" delete the space (i.e., no new paragraph).
Column 13, line 5, after "ratios" insert a period (.).
Column 14, line 40, after "springs" insert a period (.).
Column 14, line 48, after "right" insert a period (.).
Column 15, line 38, delete "passe" and substitute --passes--.
Column 17, line 59, Claim 2, delete "third" and substitute --second--.
Column 18, line 64, Claim 4, delete "fourth" and substitute --higher--.

Signed and Sealed this

Twenty-fifth Day of May, 1993

Attest:

MICHAEL K. KIRK

*Attesting Officer*     Acting Commissioner of Patents and Trademarks